US012666390B2

(12) United States Patent
Masal et al.

(10) Patent No.: US 12,666,390 B2
(45) Date of Patent: Jun. 23, 2026

(54) ARCHITECTURE, PROTOCOL, AND SIGNALING FLOW FOR SIDELINK POSITIONING AND RANGING

(71) Applicants: Centre of Excellence in Wireless Technology, Chennai (IN); Indian Institute of Technology Madras (IIT Madras), Chennai (IN)

(72) Inventors: Abhijeet Abhimanyu Masal, Chennai (IN); Jishnu Ponnappan, Chennai (IN); Jeniston Deviraj Klutto Milleth, Chennai (IN); Bhaskar Ramamurthi, Chennai (IN)

(73) Assignees: Centre of Excellence in Wireless Technology, Chennai (IN); Indian Institute of Technology Madras (IIT Madras), Chennai (IN)

( * ) Notice: Subject to any disclaimer, the term of this patent is extended or adjusted under 35 U.S.C. 154(b) by 251 days.

(21) Appl. No.: 18/585,656

(22) Filed: Feb. 23, 2024

(65) Prior Publication Data

US 2024/0306121 A1　Sep. 12, 2024

(30) Foreign Application Priority Data

Feb. 24, 2023　(IN) ............................. 202341012748

(51) Int. Cl.
*H04Q 7/20*　(2006.01)
*H04W 64/00*　(2009.01)
*H04W 72/40*　(2023.01)
*H04W 76/14*　(2018.01)

(52) U.S. Cl.
CPC ......... *H04W 64/003* (2013.01); *H04W 72/40* (2023.01); *H04W 76/14* (2018.02)

(58) Field of Classification Search
CPC ... H04W 64/003; H04W 72/02; H04W 72/25; H04W 72/40; H04W 72/121; H04W 72/231; H04W 76/14; H04W 80/02; H04W 80/08
See application file for complete search history.

(56) References Cited

U.S. PATENT DOCUMENTS

| | | | | |
|---|---|---|---|---|
| 12,538,256 | B2 * | 1/2026 | Baek | H04W 64/00 |
| 2023/0319857 | A1 * | 10/2023 | Zhou | H04W 72/40 |
| 2025/0247818 | A1 * | 7/2025 | Manolakos | H04W 76/28 |

* cited by examiner

*Primary Examiner* — Tuan Pham
(74) *Attorney, Agent, or Firm* — Wood Herron & Evans LLP

(57) ABSTRACT

A method of Side-Link positioning by at least one first node is described. The method includes receiving at least one location service request from at least one entity for estimating a location of at least one fourth node. The method further includes establishing a communication link with at least one second node, at least one third node, or the at least one fourth node. The method further includes estimating the location of the at least one fourth node using location identification procedures involving at least one of the at least one second node, the at least one third node, and the at least one fourth node based on the at least one location service request. The method further includes transmitting at least one location service response to the at least one entity.

84 Claims, 19 Drawing Sheets

ARCHITECTURE, PROTOCOL, AND SIGNALING FLOW FOR SIDELINK POSITIONING AND RANGING

CROSS-REFERENCE TO RELATED APPLICATION

The present application claims priority under 35 U.S.C. § 119 of Indian Patent Application number 202341012748, filed Feb. 24, 2023, the disclosure of which is hereby incorporated herein by reference in its entirety.

FIELD OF THE INVENTION

The present invention relates to positioning in a wireless communication system, and more particularly to sidelink positioning in different network coverage scenarios.

BACKGROUND OF THE INVENTION

In the evolution of mobile communication, positioning is a strong and vital feature in 5G, due to its wide range of business applications. Emergency call positioning emerges as an important use case due to regulatory requirements from Federal communications commission (FCC). Many other critical services rely on positioning, with much stringent requirements on accuracy, time to first fix, and latency. Further various commercial applications and use cases are coming up with more tight positioning requirements in 5G and beyond studies.

Third-generation partnership project (3GPP), as well as other standard-bearing organizations, have focused on providing an accurate positioning measurement of user equipment (UE). 3GPP technology, such as Long-Term Evolution (LTE), LTE-Advanced, and 5G/New Radio (NR) gives increased importance to the sub-meter positioning accuracy of the UE. Increasing the positioning accuracy of a UE can help to protect vulnerable road users (VRUs), such as pedestrians, wheelchairs, and cyclists from vehicles, specifically autonomously driving vehicles. Protection of VRUs requires accurate sidelink positioning when a UE is not connected to at least one of the base stations (BS) or required network coverage is not available.

In 5G systems, positioning is supported as a service, and different methods are being standardized. Such methods include DL-Time difference of arrival (DL-TDOA), enhanced cell-ID (E-CID), Observed Time Difference of Arrival (OTDOA), Uplink Angle of Arrival (UL-AoA), Uplink Relative Time of Arrival (UL-RTOA), Uplink Time Difference of Arrival (UL-TDOA), and Multi-Round Trip Time (M-RTT). Architecture enhancement for positioning support is provided in TS 23.273 and special positioning-related protocols are introduced. Such positioning-related protocols include LTE Positioning Protocol (LPP), NR Positioning Protocol Annex (NRPPa), and LTE Positioning Protocol Annex (LPPa).

FIG. 1 illustrates an architecture of 5G positioning feature. In 5G/LTE, the positioning of a target UE is triggered based on a request made to a location management server (LMF) which resides in a core network (CN) and interfaces with the NG-RAN via Access and mobility management function (AMF). The request is generated by one of networks, target UE, and any external agent. The LMF interacts with the AMF and an NG-RAN via standard interfaces NLs and NRPPa (-NLs-NG-C-) respectively. The server terminates at UE through the LPP protocol, which is transparent to NGRAN. NRPPa and LPP enable the exchange of necessary information elements between NG-RAN and UE, and the server, respectively. The 5G positioning architecture also allows positioning a target UE based on NG-eNB via LPP (RRC) protocol for NSA mode. The UE and NG-RAN perform measurements with respect to each other over NR-Uu and LTE-Uu for gNB-TRPs and ng-eNB-TPs in NSA and SA modes, respectively. For DL-based positioning, the LMF provides configurations to the NG-RAN for transmission (or broadcasting) of reference signals and to target UE for measuring the reference signals. Similarly, for UL-based positioning, the LMF provides resource configurations to the target UE for transmission (or broadcasting) of reference signals and to NG-RAN for measuring the reference signals. The resource configurations provided to the transmitter indicate the parameters for the generation and transmission of reference signals (RS), repetition/periodicity of RS resource(set)s, transmission filters, transmission frequency bands, etc. The resource configurations for the receiver contain RS-IDs, measurement windows, measurement gaps, frequency bands, receive filters, etc.

For connected vehicles, industry demands very stringent requirements on vehicle localization in the surrounding. 5G automotive association (5GAA) provides positioning requirements for 58 vehicle-to-anything (V2X) services summarized into three groups. A first group with tens of meters accuracy, a second with lane level accuracy, and a third group with sub-meter level accuracy. The positioning requirements can be as the 3D/2D coordinates (absolute position) or as the distance and/or angle (relative position) from a reference point, e.g., another UE. The Society of Automotive Engineers (SAE) Advanced Applications Technical Committee (SAE AA TC) specifies that it is necessary to have a 3GPP positioning technology that supports advanced V2X applications working even in various out-of-coverage scenarios. In terms of horizontal or lateral/longitudinal accuracy, requirements for absolute position or relative position can be categorized into three sets as follows, Set 1: 10-50 m with 68-95% confidence level.

Set 2: 1-3 m with 95-99% confidence level.

Set 3: 0.1-0.5 m with 95-99% confidence level.

Sidelink link positioning can be visualized as cooperative localization. In the cooperative localization paradigm, nodes include master nodes (BS, relay node Non-terrestrial BS, etc.) and slave nodes (like UE, V2X UEs, etc.) that help each other for improving coverage and positioning with improved accuracy. In 5G Uu positioning, more than one BS (a.k.a. gNB, eNB, etc.) is configured to perform one of the measurements mentioned and LMF/SI positioning server will collect all measurements from all the BSs to estimate the most accurate positioning. Accuracy of the positioning increases with availability of more than one assisting node. GDOP is an important problem in positioning that negatively affects the positioning accuracy when the target UE position is at one of the edges of the triangle or even crosses the edge, and anchor UEs act as the different vertex of the triangle. The effect of GDOP which occurs because of geometry decreases when the target UE moves toward the center of the triangle. The number of increased measurements may help in minimizing the GDOP of target UE and maintaining accurate positioning. But in some cases, availability of sufficient measurements (i.e., the participating gNB/TRPS to localize the target in Uu based positioning) is not sufficient. In such cases, Uu+sidelink based positioning is beneficial to achieve a required QoS from the positioning service. Therefore, it is necessary to extend the positioning support over sidelink.

Extending positioning for the sidelink arises in three deployment scenarios. In a first scenario i.e. an in-coverage scenario, a position of the target UE is limited by its coverage, and in some cases, it will be difficult to find at least 3 neighboring BSs to perform the positioning. In this case, the BS must find devices present nearby the target node. The neighboring UEs can be selected based on the line of sight (LOS) link, doppler/mobility, distance from the target device, UE capability, status-busy/idle, etc. Furthermore, the location estimate of the assisting nodes must be known. In this scenario, the target UE and all assisting UEs will be in the direct or indirect coverage of the associated BS node. Indirect coverage means connected to neighboring BS and master BS communicates with the connected neighbor BS.

In a second scenario i.e. a partial coverage scenario, the target UE or positioning requesting UE (anchor UE) is present out of coverage but can connect to the BS via a UE relay (L2 and L3 relay). In such case, the UE relay will act as a routing node and send the messages from the BS node to the target node and vice versa.

FIG. 2 illustrates the in-coverage and the partial coverage scenarios for a deployment of NR network with two BSs i.e. gNB1 and gNB2. UE1 and UE2 and UE relay are connected to gNB1 whereas UE3 and UE4 are connected to gNB2. UE3 is neither connected to gNB1 or gNB2 and is thus present out-of-coverage of the NR network. UE3 is connected to gNB1 indirectly using the UE relay. This relay can be UE-to-Network replay type L2 or L3 or L1. For example, if UE1 is a target UE, then the UE1 can use gNB1 and gNB2 for localization but two gNBs are not sufficient to get a desired accuracy. In such case, the UE1 can take help of surrounding UEs like UE replay and UE2 and use Uu+PC5 link based positioning to get itself localized. In case of UE 3, this can happen with the help of UE relay connecting UE3 to network (gNB-2) indirectly and routing signaling from LMF through gNB1 and UE relay.

In a third scenario i.e. an out-of-coverage scenario or no network coverage scenario, neither assisting UEs or anchor UE (UE relay) nor the target node will be present in the coverage of any BS.

FIG. 3 depicts an out of coverage scenario in a highway environment where no network is present. Roadside units (RSUs) are provided alongside the highway for communicating with V2X UE using NR slide link over PC5 link. The RSUs are special UEs which may be deployed on fixed objects present alongside the roads, such as light poles as such objects and with known location are easy to localize using legacy methods like Uu link positioning or GNSS. One RSU of the RSUs can act as positioning server and may have the location request and control unit (LRCU) to manage the request and authenticate the request based on criteria like security, privacy of nodes etc. RSUs establish PC5 links with V2X UE and perform positioning reference signal (PRS) transmission to a V2X UE. The V2X UE will measure the positioning measurement and send the result back to one of the RSUs. The request can be generated by SL application residing in the target UE or an RSU which is reference/anchor UE or can be from other V2X UE in the vicinity of target V2X UE.

Therefore, there remains a need of communication architectures and signaling procedures for use in the above described different side link positioning and ranging scenarios including in-coverage, partial coverage, and out-of-coverage scenarios.

OBJECTS OF THE INVENTION

A general objective of the present invention is to achieve Sidelink (SL) positioning in out-of-coverage, partial coverage, and in-coverage scenarios.

Another objective of the invention is to provide a protocol layering structure for SL positioning.

Yet another objective of the invention is to define signaling flow for SL positioning.

SUMMARY OF THE INVENTION

The summary is provided to introduce aspects related to a method of Side-Link positioning, and the aspects are further described below in the detailed description. This summary is not intended to identify essential features of the claimed subject matter nor is it intended for use in determining or limiting the scope of the claimed subject matter.

In one embodiment, a method of Side-Link positioning comprises receiving, by at least one first node, at least one location service request from at least one first entity for estimating a location of at least one fourth node. The at least one first entity is at least one of at least one second node, at least one fourth node, at least one external application connected to the at least one first node, at least one internal application connected to one of the at least one first node and the at least one fourth node, at least one Access and Mobility Management Function (AMF), at least one Location Request and Control Unit (LRCU), and at least one SL positioning server. The method further comprises establishing, by the at least one first node, a communication link with at least one of the at least one second node, at least one third node, and the at least one fourth node. The at least one second node and the at least one fourth node lies in one of in-coverage region, partial-coverage region, and out-of-coverage region of the at least one first node, wherein the communication link is established using at least one of side link positioning protocol (SLPP), LTE positioning protocol, NR positioning protocol annex (NRPPa), LTE positioning protocol annex (LPPa), ranging & Sidelink positioning protocol (RSPP) over at least one of PC5, Uu, and NG link. The method further comprises estimating, by the at least one first node, the location of the at least one fourth node using location identification procedures involving at least one of the at least one second node, the at least one third node, and the at least one fourth node based on the at least one location service request. The method further comprises transmitting, by the at least one first node, at least one location service response to the at least one first entity. The at least one location service response comprises the location of the at least one fourth node and at least one additional result related to the location.

In one aspect, the at least one fourth node is one of the at least one first node, the at least one second node, the at least one third node, and at least one node specified in the location service request.

In one aspect, the location identification procedures further comprise exchanging, by the at least one first node, at least one positioning signaling message with at least one of the at least one second node, the at least one third node, and at least one fourth node.

In one aspect, the at least one first node exchanges the location procedure with at least one of the at least one fourth node and at least one second through at least one intermediate node, and wherein the at least one intermediate node is one of the at least one second node and the at least one fourth node.

In one aspect, exchanging at least one positioning signaling message is performed using SLPP Packet data Unit (PDU) when the at least one second node and the at least one fourth node lies in the out-of-coverage region.

In one aspect, the at least one positioning signaling message comprises at least one of capability message, assistance information message, location request message, abort message, and error message.

In one aspect, the location request message comprises at least one of request location measurement and location information.

In one aspect, the at least one first node comprises of a physical layer, Media Access Control (MAC) layer, Radio Link Control (RLC) layer, Internet Protocol (IP layer), Transmission Control Protocol (TCP) layer, Transport Layer Security (TLS) layer, Hypertext Transfer Protocol (HTTP)/2 layer, LTE positioning protocol (LPP) layer, and SLPP layer.

In one aspect, the at least one second node and the at least one fourth node comprises of a physical layer, MAC layer, RLC layer, Packet Data Convergence Protocol (PDCP) layer, one of PC5-Radio Resource Control (RRC) layer and SDAP, one of the SLPP layer and the LPP layer.

In one aspect, the method of Side-Link positioning further comprises receiving, by the at least one LRCU, the at least one location service request from the at least one second entity, and authenticating and forwarding the at least one location service request to the at least one first node when the at least one second node and the at least one target node lies in the out-of-coverage region.

In one aspect, the method of Side-Link positioning further comprises receiving, by the at least one LRCU, the at least one location service response from the at least one first node; and forwarding the at least one location service response to the at least one second entity when the at least one second node and the at least one fourth node lies in out-of-coverage region.

In one aspect, the at least one second entity is at least one of at least one second node, at least one fourth node, at least one external application connected to the at least one first node, at least one internal application connected to one of the at least one first node and the at least one target node, at least one Access and Mobility Management Function (AMF), at least one Location Request and Control Unit (LRCU), and at least one SL positioning server.

In one aspect, the at least one LRCU comprises of at least one of a physical layer, MAC layer, RLC layer, IP layer, TCP layer, TLS layer, HTTP/2 layer, LTE positioning protocol (LPP) layer, and SLPP layer for communicating with the at least one first node.

In one aspect, the at least one LRCU comprises a physical layer, MAC layer, RLC layer, PDCP layer, and one of PC5-RRC layer and SDAP for communicating with the at least one second node and the at least one fourth node.

In one aspect, the at least one AMF authenticates and forwards the at least one location service request to the at least one first node when the at least one second node and the at least one fourth node lies in the in-coverage region and the partial-coverage region on receiving the at least one location service request.

In one aspect, the at least one AMF receives the at least one location service response from the at least one first node and forwards the at least one location service response to the at least one entity when the at least one second node and the at least one fourth node lies in the in-coverage region and the partial-coverage region.

In one aspect, at least one AMF comprises of a physical layer, MAC layer, RLC layer, IP layer, TCP layer, TLS layer, HTTP/2 layer for communicating with the at least one first node, and the least one AMF comprises of the physical layer, the MAC layer, the RLC layer, PDCP layer, RRC layer and SDAP for communicating with the at least one second node and the at least one fourth node.

In one aspect, the at least one additional result comprises at least one of a location quality of the service (QOS) and one of success and failure indication of location estimation of the at least one fourth node.

In one aspect, the at least one third node performs a relaying operation of the location procedure between the at least one first node and at least one of the at least one second node and the at least one fourth node.

In one aspect, the at least one first node exchanges at least one of LPP PDU, SLPP PDU and SLPP PDU inside LPP PDU with at least one of the at least one second node, the at least one third node and the at least one target node for carrying the at least one positioning signaling message in a Non-Access Stratum (NAS) PDU when the at least one second node and the at least one fourth node lies in the in-coverage region.

In one aspect, the at least one first node exchanges at least one of LPP PDU, SLPP PDU, and SLPP PDU inside LPP PDU with at least one of the at least one second node and the at least one third node for carrying the at least one positioning signaling message in the NAS PDU when the at least one second node and the at least one fourth node lies in the partial-coverage region.

In one aspect, at least one second node converts the LPP PDU into the SLPP PDU and forwards the SLPP PDU to the at least one fourth node over the PC5 link.

In one aspect, the at least one third node acts as one of a L2 relay node and a L3 relay node to relay LPP PDU, the SLPP PDU and SLPP PDU inside LPP PDU between the at least one first node and at least one of the at least one second node and the at least one fourth node.

In one aspect, the at least one third node acting as the L2 relay node relays at least one of the LPP PDU and the SLPP PDU from the PDCP layer of the NG-RAN to the PDCP layer of at least one of the at least one fourth node and at least one second node using Side-Link Relay Adaptation (SRAP) protocol layer of the at least one third node.

In one aspect, the at least one third node acting as the L3 relay node relays at least one of the LPP PDU and SLPP PDU from at least one of the PC5-RRC layer and SDAP of the at least one third node to at least one of the PC5-RRC layer and SDAP layer of at least one of the at least one fourth node and at least one second node.

In one aspect, the at least one first node initiates at least one of SLPP and LPP multiple times among the at least one second node, the at least one third node, and the at least one fourth node in parallel.

In one aspect, the at least one first node exchanges the SLPP PDU and LPP PDU using a session ID for a particular session.

In one aspect, exchanging the capability message further comprises transmitting, by the at least one first node, a request for capability information to the at least one second node and the at least one fourth node; and receiving, by the at least one first node, the capability information from the at least one second node and the at least one fourth node. The capability information comprises at least one of message segmentation capability, positioning reference signal (PRS) processing capability, PC5 capability, positioning server capability, relay capability including L2 and L3 type, positioning methods supported, maximum frequency layer supported, side-link band combination supported, supported bandwidth, supported SCS, PRS processing duration, maximum PRS configuration handling capability, FR1/FR2 support, PRS buffer types, and Quasi Co Location (QCL) capabilities.

In one aspect, the request for capability information is transmitted using SLPP capability message, and the capability information is received using SLPP provide capabilities message.

In one aspect, exchanging at least one assistance information message further comprises receiving, by the at least one first node, a request for assistance data from the at least one second node and the at least one fourth node; and transmitting, by the at least one first node, the assistance data to at least one of the at least one second node and the at least one fourth node. The assistance data comprises at least one of Physical Cell IDs (PCIs), Global Cell IDs (GCIs), and Transmission/Reception Point (TRP) IDs of candidate NR-TRPs, assisting node IDs, reference assisting node, positioning server ID, session ID, an indication of session less operation, assisting node/TRP locations, positioning reference, synchronization offsets.

In one aspect, the request for assistance data is received using SLPP request assistance data message, and the assistance data is transmitted using SLPP provide assistance data message.

In one aspect, exchanging at least one location request message further comprises transmitting, by the at least one first node, a request for location information to the at least one second node and the at least one fourth node; and receiving, by the at least one first node, the location information from the at least one second node and the at least one fourth node. The location information comprises at least one of at least one positioning estimate, at least one positioning measurement, and used at least one SL-PRS configuration.

In one aspect, the request for location information is transmitted using SLPP request location information message, and the location information is received using SLPP provide location information message.

In one aspect, the error message is transmitted, by the at least one first node, using an error notification message to the at least one second node and the at least one fourth node if an SLPP message is erroneous.

In one aspect, the abort message is notified, by the at least one first node, using the at least one second node and the at least one fourth node to abort the procedure.

The method as claimed in claim 1, wherein the positioning of the at least one fourth node is performed using at least one of time-based method, angle-based method, and phase-based method.

In one aspect, the time-based method comprises at least one of Side-link Time difference of arrival (SL-TDOA) positioning method and Side-link multi-round trip time (SL-mRTT) positioning method.

In one aspect, the angle-based method comprises at least one of Side-link Angle of Arrival (SL-AoA) positioning method and Side-link Angle of Departure (SL-AOD) positioning method.

In one aspect, the phase-based method comprises SL-carrier phase-based positioning method.

In one aspect, the SL-TDOA positioning method comprises configuring, by the at least one first node, the at least one second node to transmit at least one Positioning Reference Signal (PRS) to the at least one fourth node. The SL-TDOA positioning method further comprises receiving, by the at least one first node, measurement of at least one of Reference Signal Time (RST), Reference Time of Arrival (RTOA), and Reference Signal Time Difference (RSTD) based on the at least one PRS from the at least one fourth node. The RSTD is a difference between RST of the at least one second node and RST of the at least one fourth node, and the RTOA is a difference between RST and a reference time pre-configured. The SL-TDOA positioning method further comprises receiving, by the at least one first node, measurement of at least one of Angle of Arrival (AoA), Reference Signal Received Power (RSRP), Line of Sight (LOS) probability, and timestamp corresponding to each RSTD/RST from the at least one fourth node.

In one aspect, the SL-mRTT positioning method comprises configuring, by the at least one first node, the at least one second node to transmit at least one first PRS sequence in a preconfigured PRS resource to the at least one fourth node at a first time instant and to receive at least one second PRS sequence from the at least one fourth node at a second time instant; and receiving, by the at least one first node, measurement from the at least one second node and the at least one fourth node. The measurement comprises at least one of a difference between transmission time at the first time instant and reception time at the second time instant for determination of a Round Trip Time (RTT) in terms of at least one of a Rx-Tx time difference of arrival, a Rx-Rx time difference of arrival, and a Tx-Tx time difference of arrival.

In one aspect, the at least one first node performs positioning of the at least one fourth node based on the difference between the transmission time and the reception time, quasi-co-location (QCL) assumptions, Transmission-Reception beam pair hypothesis, and RSRP of the difference between the transmission time and the reception time.

In one aspect, the SL-AoA positioning method comprises configuring, by the at least one first node, the at least one second node to transmit the at least one PRS to the at least one fourth node; and receiving, by the at least one first node, at least one measurement from the at least one second node and the at least one fourth node. The at least one measurement comprises AoA measured based on at least one tap in a power delay profile (PDP) estimation and antenna parameters.

In one aspect, the antenna parameters comprise at least one of antenna spacing, antenna pattern, beamwidth, and antenna power per element.

In one aspect, the SL-AOD positioning method comprises configuring, by the at least one first node, the at least one second node to transmit the at least one PRS using at least one beam to the at least one fourth node; and receiving, by the at least one first node, at least one power measurement from the at least one second node and the at least one fourth node. The at least one power measurement is performed using reference signal received power (RSRP), received signal strength indicator (RSSI), and signal to noise ratio (SNR).

In one aspect, at least one of the at least one fourth node and the at least one second node sweeps at least one beam in the spatial dimension in Zenith and Azimuth direction with redefined angles based on at least one of a number of antennas, antenna type, bore sight, beam width, and beamforming capability.

In one aspect, the at least one second node and at least one fourth node are configured in a complementary direction to receive the at least one PRS over side-link.

In one aspect, the SL-carrier phase-based positioning method comprises configuring, by the at least one first node, the at least one second node to transmit the at least one PRS to the at least one fourth node; and receiving, by the at least one first node, carrier phase measurement from the at least one second node and the at least one fourth node. The carrier phase measurement is used to measure time of flight and the positioning of the at least one fourth node.

In one aspect, the PRS is at least one pseudo-random sequence.

In one aspect, the at least one first node configures the at least one second node to transmit at least one pseudo-random sequence to the at least one fourth node.

In one aspect, the at least one pseudo-random sequence is given by:

$$r_{slprs}(m) = \frac{1}{\sqrt{2}}(1 - 2c(2m)) + j\frac{1}{\sqrt{2}}(1 - 2c(2m + 1))$$

In one aspect, the at least one pseudo-random sequence is initialized as:

$$c_{init} = \left(2^x\left(N_{symb}^{slot}n_{s,f}^\mu + l_{SL\text{-}PRS} + 1\right)(2n_{ID} + 1) + n_{ID}\right)$$

wherein x is an arbitration factor, $c_{init}$ provides an initial seed for pseudo random sequence generation, $n_{ID}$ provide specific identification embedded in the sequence to define the association of the at least one pseudo-random sequence and at least one of the at least one second node and the at least one fourth node.

In one aspect, the at least one pseudo-random sequence is filled in side-link slot over at least one of at least one resource blocks (RBs) and at least one symbol in the configured a subchannel.

In one aspect, mapping of resource elements of the at least one pseudo-random sequence is given by:

$$r_{k\_slprs, l\_slprs}^{p,\mu}(m) = \beta_{slprs}r_{slprs}(m)$$
$$m = 0, 1, 2 \ldots$$

wherein p is a port of the at least one pseudo-random sequence, $\mu$ is a numerology of the at least one pseudo-random sequence, $r_{slprs}$ is the at least one pseudo-random sequence and $\beta_{slprs}$ is power control offset.

In one aspect, the at least one pseudo-random sequence is transmitted in comb pattern resources, wherein the comb pattern resources are at least one of fully staggered, partially staggered, and unstaggered in frequency domain.

In one aspect, the fully staggered comb pattern resources comprises number of repetitions of the at least one pseudo-random sequence symbol equal to comb factor, the partially staggered comb pattern resources comprises number of repetitions of the at least one pseudo-random sequence less than comb factor and the unstaggered comprises same resource element offset across number of repetitions.

In one aspect, the at least one pseudo-random sequence comb pattern resources in the frequency domain is given by:

$$k\_slprs = mK_{comb}^{SL\text{-}PRS} + \left(k_{offset}^{SL\text{-}PRS} + \acute{k}\right) \bmod K_{symb}^{SL\text{-}PRS}$$

wherein $$K_{comb}^{KL\text{-}PRS}$$

is a possible comb pattern, $$k_{offset}^{SL\text{-}PRS}$$

is the resource element offset and $\acute{k}$ is a relative offset as function of symbol $l_{SL\text{-}PRS}$.

In one aspect, the at least one pseudo-random sequence comb pattern resources in a time domain is given by:

$$l_{slprs} = \left[l_{start}^{SL\text{-}PRS}, l_{start}^{SL\text{-}PRS} + M\right]$$

wherein is $$l_{start}^{SL\text{-}PRS}$$

a start of a symbol in a slot and M is a maximum number of repetitions.

In one embodiment, a method of Side-Link positioning comprises establishing, by the at least one second node, a communication link with at least one of the at least one first node, at least one third node, and at least one fourth node. The at least one first node, at least one second node and the at least one fourth node lies in one of in-coverage region, partial-coverage region, and out-of-coverage region. The communication link is established using at least one of side link positioning protocol (SLPP), LTE positioning protocol, NR positioning protocol annex (NRPPa), LTE positioning protocol annex (LPPa), ranging & Sidelink positioning protocol (RSPP) over at least one of PC5, Uu, and NG link. The method further comprises receiving, by the at least one second node, at least one positioning signaling message from the at least one first node and the at least one fourth node.

The method further comprises transmitting, by the at least one second node, response to at least one positioning signaling message to the at least one first node and the at least one fourth node. The location information comprises at least one of at least one positioning estimate, at least one positioning measurement, and used at least one SL-PRS configuration.

In one aspect, exchanging at least one positioning signaling message is performed using SLPP Packet data Unit (PDU) when the at least one second node and the at least one fourth node lies in out-of-coverage region.

In one aspect, the at least one positioning signaling message comprises at least one of capability message, assistance information message, location request message, abort message, and error message.

In one aspect, the location request message comprises at least one of request location measurement and location information.

In one aspect, the at least one first node comprises of a physical layer, Media Access Control (MAC) layer, Radio Link Control (RLC) layer, Internet Protocol (IP layer), Transmission Control Protocol (TCP) layer, Transport Layer Security (TLS) layer, Hypertext Transfer Protocol (HTTP)/2 layer, LTE positioning protocol (LPP) layer, and SLPP layer.

In one aspect, the at least one second node and the at least one fourth node comprises of a physical layer, MAC layer, RLC layer, Packet Data Convergence Protocol (PDCP) layer, one or PC5-Radio Resource Control (RRC) layer and SDAP, one of the SLPP layer and the LPP layer.

In one aspect, the at least one second node converts the LPP PDU into the SLPP PDU and forwards the SLPP PDU to the at least one at least one first and fourth node over the PC5 link.

In one aspect, the at least one second node initiates at least one of SLPP and LPP multiple times among the at least one first node, the at least one second node and the at least one third node in parallel.

In one aspect, the at least one second node exchanges the SLPP PDU and LPP PDU using a session ID for a particular session.

In one aspect, exchanging the capability message further comprises receiving, by the at least one second node, a request for capability information to the at least one second node and the at least one fourth node; and transmitting, by the at least one second node, a response with the capability information of the at least one target node using a SLPP Provide Capabilities message to the at least one first node and the at least one second node. The capability information comprises at least one of message segmentation capability, positioning reference signal (PRS) processing capability, PC5 capability, positioning server capability, relay capability including L2 and L3 type, positioning methods supported, maximum frequency layer supported, side-link band combination supported, supported bandwidth, supported SCS, PRS processing duration, maximum PRS configuration handling capability, FR1/FR2 support, PRS buffer types, and Quasi Co Location (QCL) capabilities.

In one aspect, the request for capability information is transmitted using SLPP capability message, and the capability information is received using SLPP provide capabilities message.

In one aspect, exchanging the assistance information message further comprises transmitting, by the at least one second node, a request for assistance data to the at least one first node and the at least one second node; and receiving, by the at least one second node, the assistance data from at least one of the at least one first node and the at least one second node. The assistance data comprises at least one of Physical Cell IDs (PCIs), Global Cell IDs (GCIs), and Transmission/Reception Point (TRP) IDs of candidate NR-TRPs, assisting node IDs, reference assisting node, positioning server ID, session ID, an indication of session less operation, assisting node/TRP locations, positioning reference, synchronization offsets.

In one aspect, the request for assistance data is received using SLPP request assistance data message, and the assistance data is transmitted using SLPP provide assistance data message.

In one aspect, exchanging the location request message further comprises receiving, by the at least one second node, a request for location information from the at least one first node and the at least one second node; and transmitting, by the at least one second node, the location information to the at least one first node and the at least one second node. The location information comprises at least one of at least one positioning estimate, at least one positioning measurement, and used at least one SL-PRS configuration.

In one aspect, the request for location information is received using SLPP request location information message, and the location information is transmitted using SLPP provide location information message.

In one aspect, the error message is received by the at least one second node, using an error notification message from the at least one first node and the at least one second node if an SLPP message is erroneous.

In one aspect, the abort message is notified by the at least one first node, the at least one second node and the at least one fourth node to abort the procedure.

In one aspect, the at least one second node receives at least one pseudo-random sequence from at least one of the at least one first node, at least one of second node at least, one of fourth node.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE INVENTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

In the evolution of mobile communication, positioning is a very strong and vital feature in 5G, due to its wide range of business applications. Various critical services rely on positioning, with many stringent requirements on accuracy, time to first fix, and latency. Further, various automotive, and commercial applications and use cases are coming up with stricter positioning requirements in 5G and beyond studies. In this case, only Uu-link based positioning methods may not be sufficient. UEs in the vicinity should be coordinated over sidelink to achieve the desired accuracy and latency in localization. The present invention provides architecture options to enable sidelink positioning in different sidelink scenarios. Further, present invention provides signaling flow, protocol stacks, and interfaces between various nodes in the sidelink positioning architecture. Also, positioning methods for localization of target over sidelink and corresponding messages to be exchanged between different nodes are provided.

Figure 1:
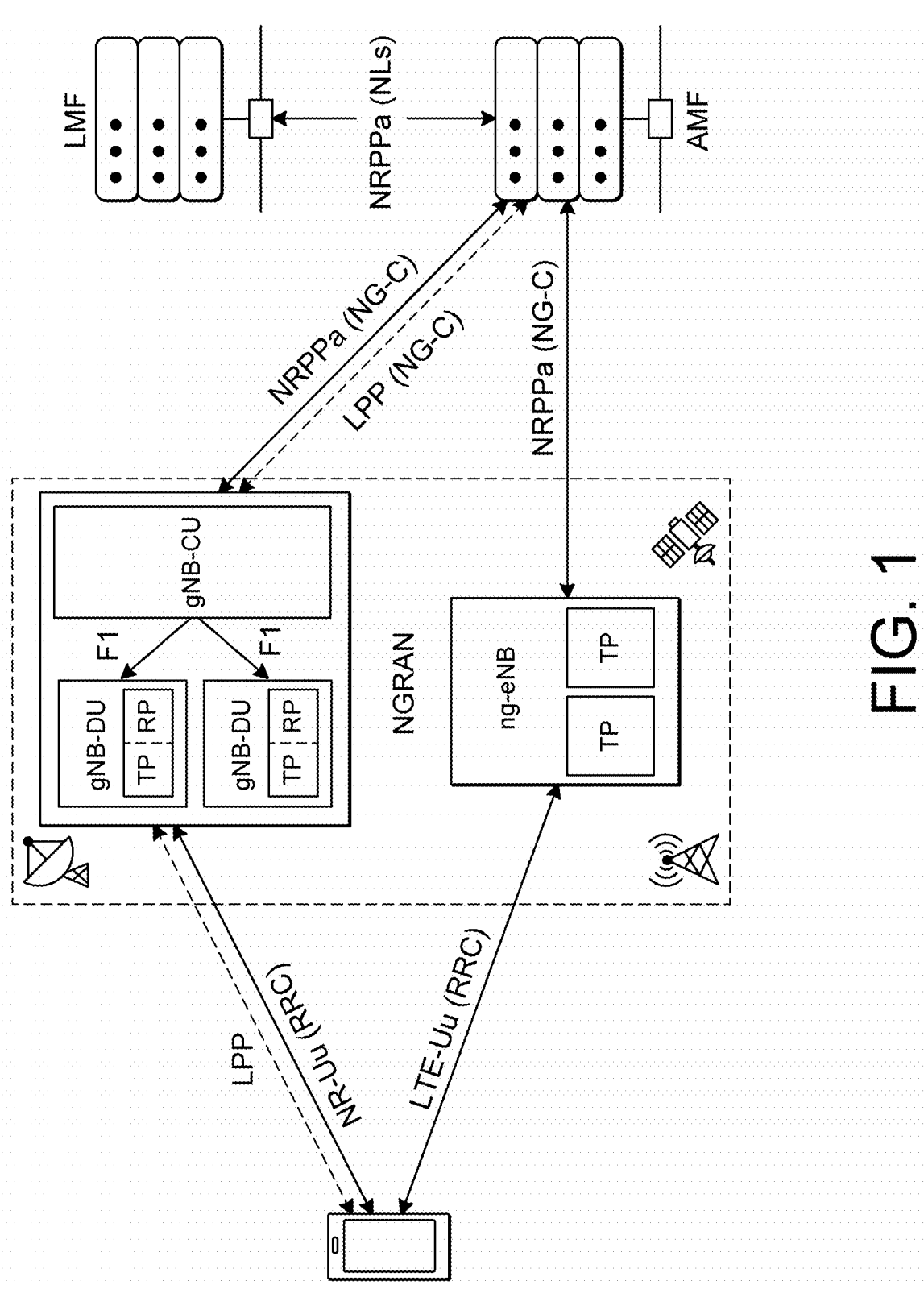
FIG. 1 illustrates an architecture of 5G positioning feature.
Figure 2:
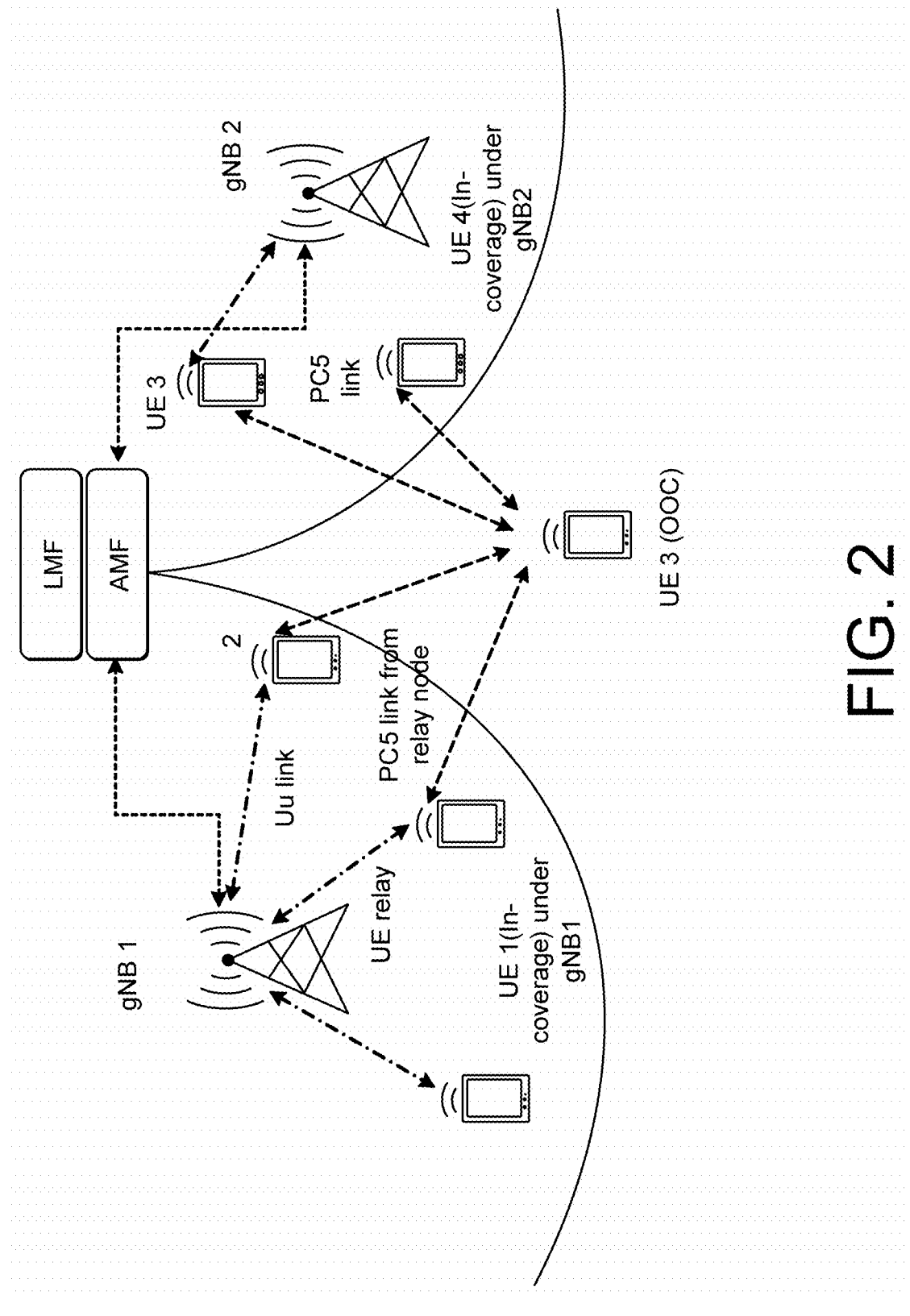
FIG. 2 illustrates the in-coverage and the partial coverage scenarios for a deployment of NR network with two BSs.
Figure 3:
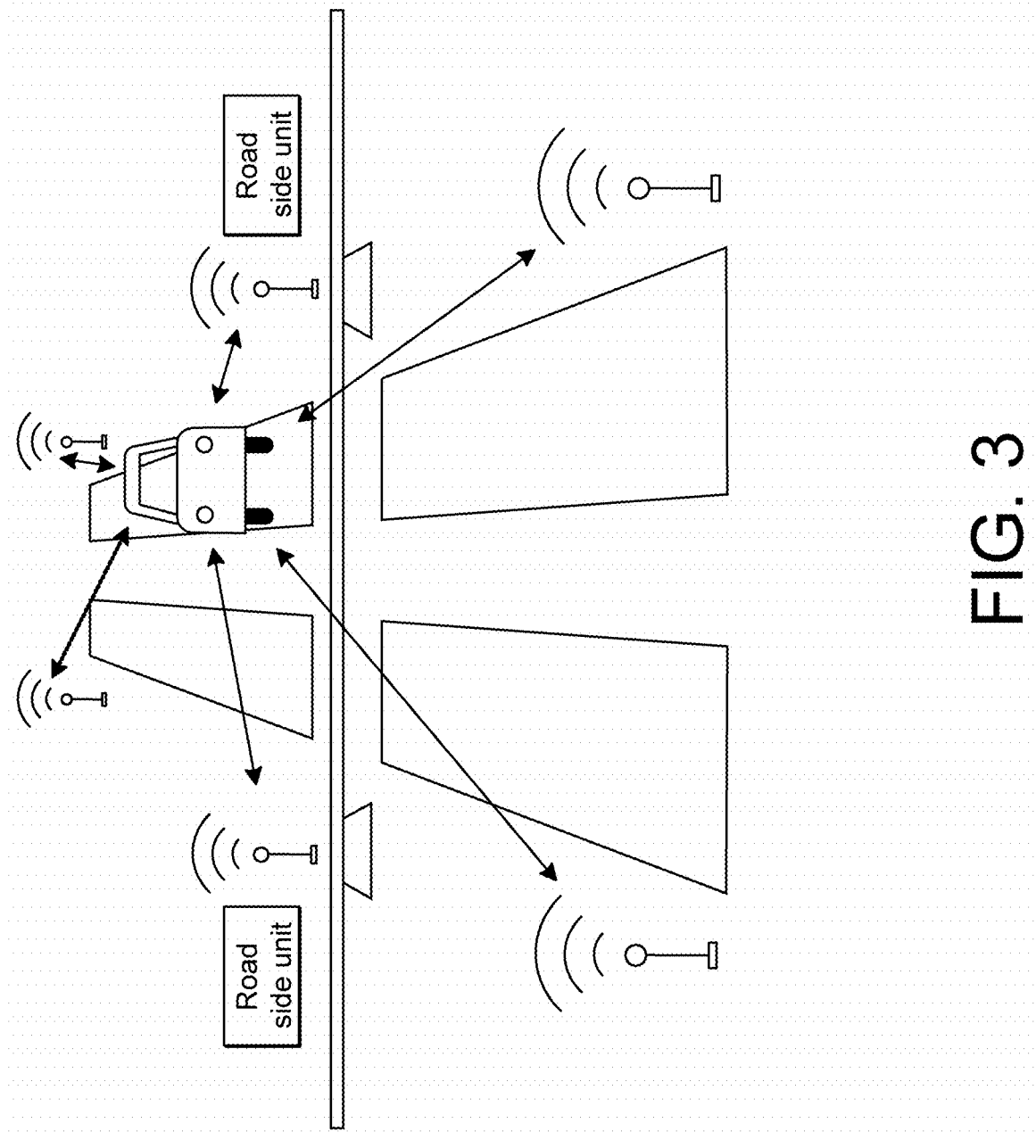
FIG. 3 depicts an out of coverage scenario in a highway environment where no network is present.
Figure 4:
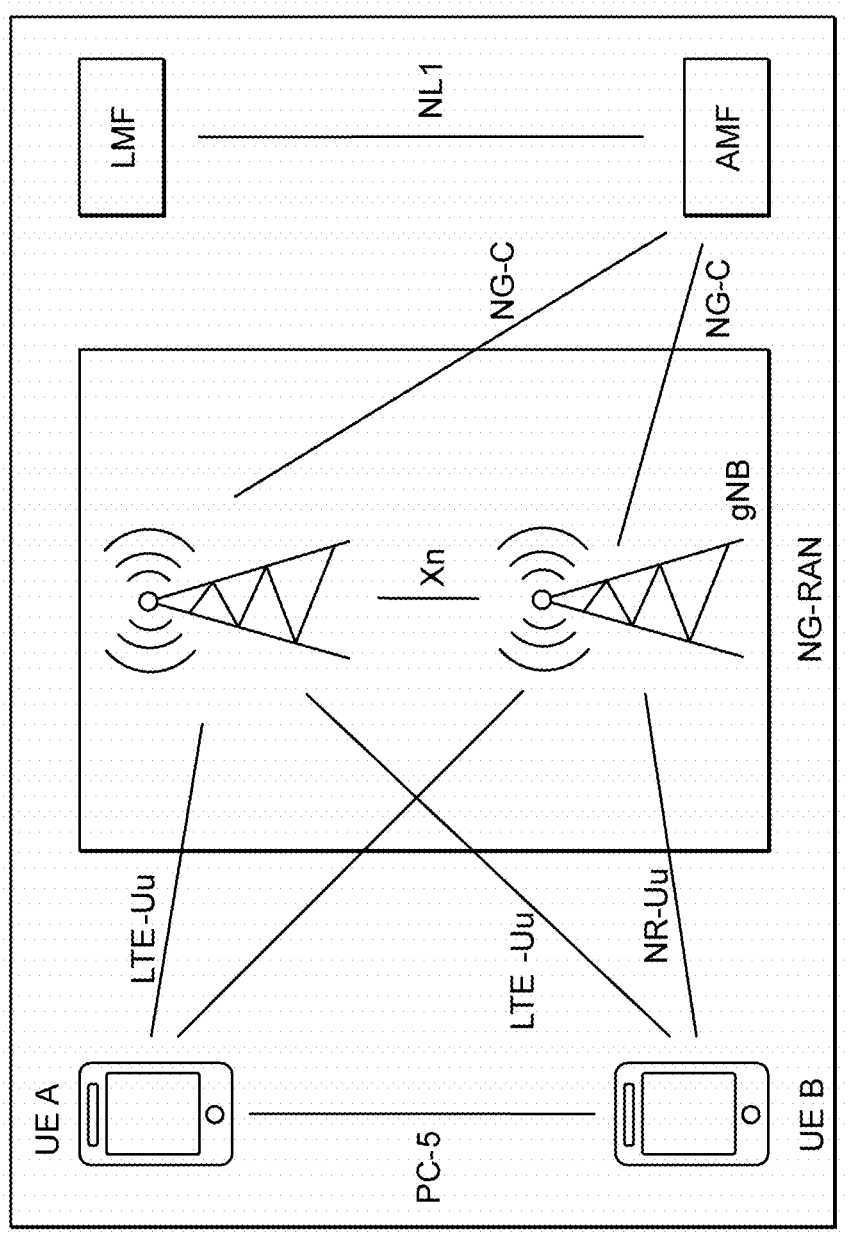
FIG. 4 illustrates an in-coverage scenario for Sidelink (SL) positioning and ranging, in accordance with an embodiment of present invention.

For SL positioning, architectures to be utilized for each scenario are described successively. FIG. 4 illustrates an in-coverage scenario for SL positioning and ranging, in accordance with an embodiment of present invention. Such architecture is similar to the legacy NR positioning architecture over a Uu link as shown in FIG. 1. Major entities present in such architecture include AMF and LMF configured inside the 5G core, NG-RAN which may have at least gNB, ng-eNB, and/or eNB. The NG-RAN serves both target and anchor UEs. The UE which needs to be positioned is termed as a target UE and the UE supporting the positioning of the target UE is called an anchor UE. The target and anchor UEs are capable of establishing a sidelink connection using a PC-5 interface. The LMF helps in localizing the target UE upon receiving a location service request from an external SL application running inside the target UE, anchor UE, or the network.

Figure 5:
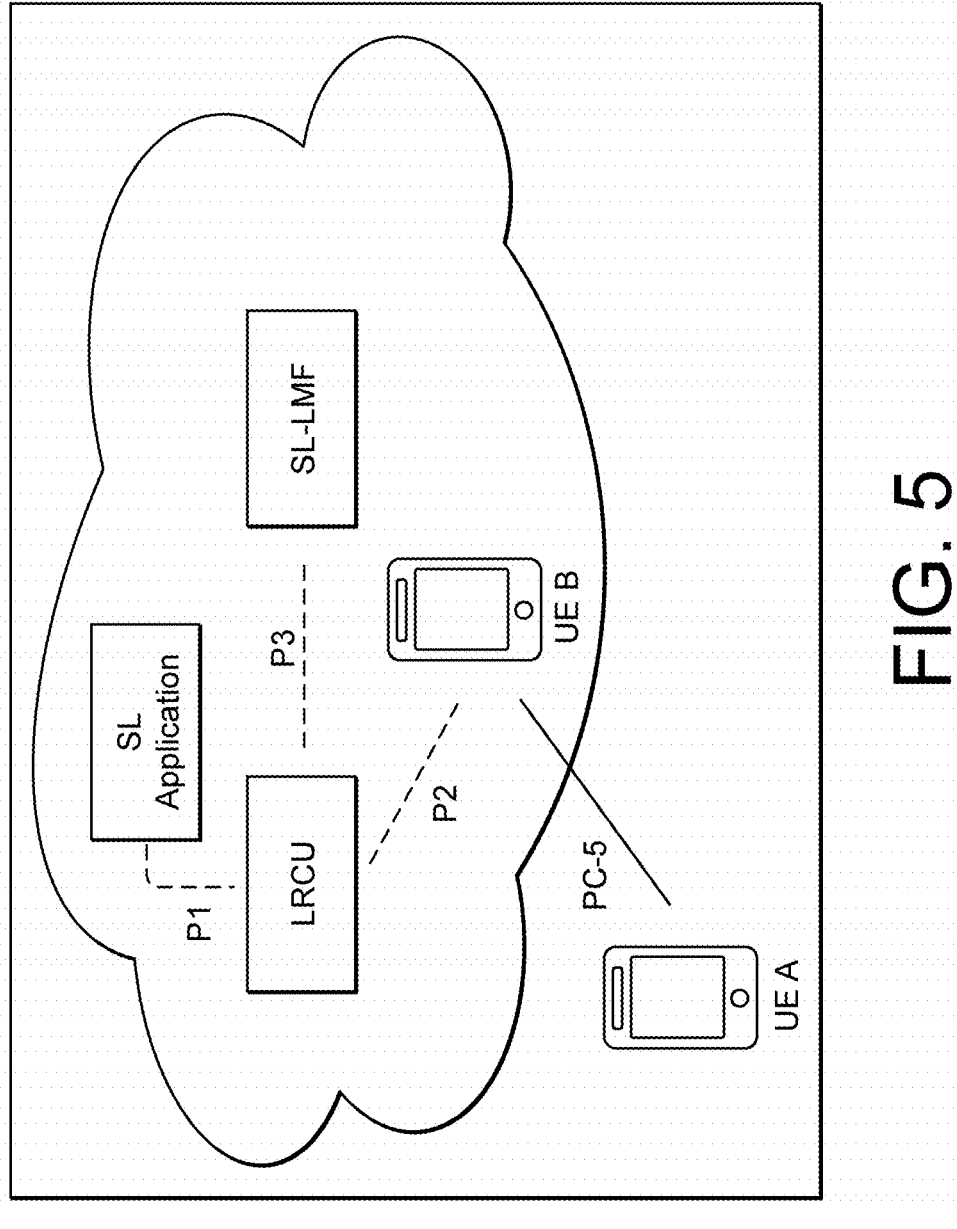
FIG. 5 illustrates an out-of-coverage scenario for SL positioning and ranging, in accordance with an embodiment of present invention.

FIG. 5 illustrates an out-of-coverage scenario for SL positioning and ranging, in accordance with an embodiment of present invention. Major entities present in such architecture include SL application function, location request control unit (LRCU) which is similar to AMF in the 5G core, SL-LMF which is similar to LMF in the 5G core but may have lesser capabilities, and UEs (target UE and anchor UE) with side link access function. SL application function, LRCU, and SL-LMF can reside inside target UE, anchor UE, or any other UE or external positioning capable server. The interfaces P1, P2, and P3 are the communication link between the SL application-LRCU, LRCU-UE, and LRCU-SL LMF as shown in FIG. 4 and they depend on the platform where the corresponding units are residing. For example, if LRCU is inside anchor UE, P2 need not be explicitly defined whereas if it is inside an external server, P2 will be equivalent to the PC-5 interface. The anchor UE may communicate with the target UE via the PC-5 interface.

Figure 6:
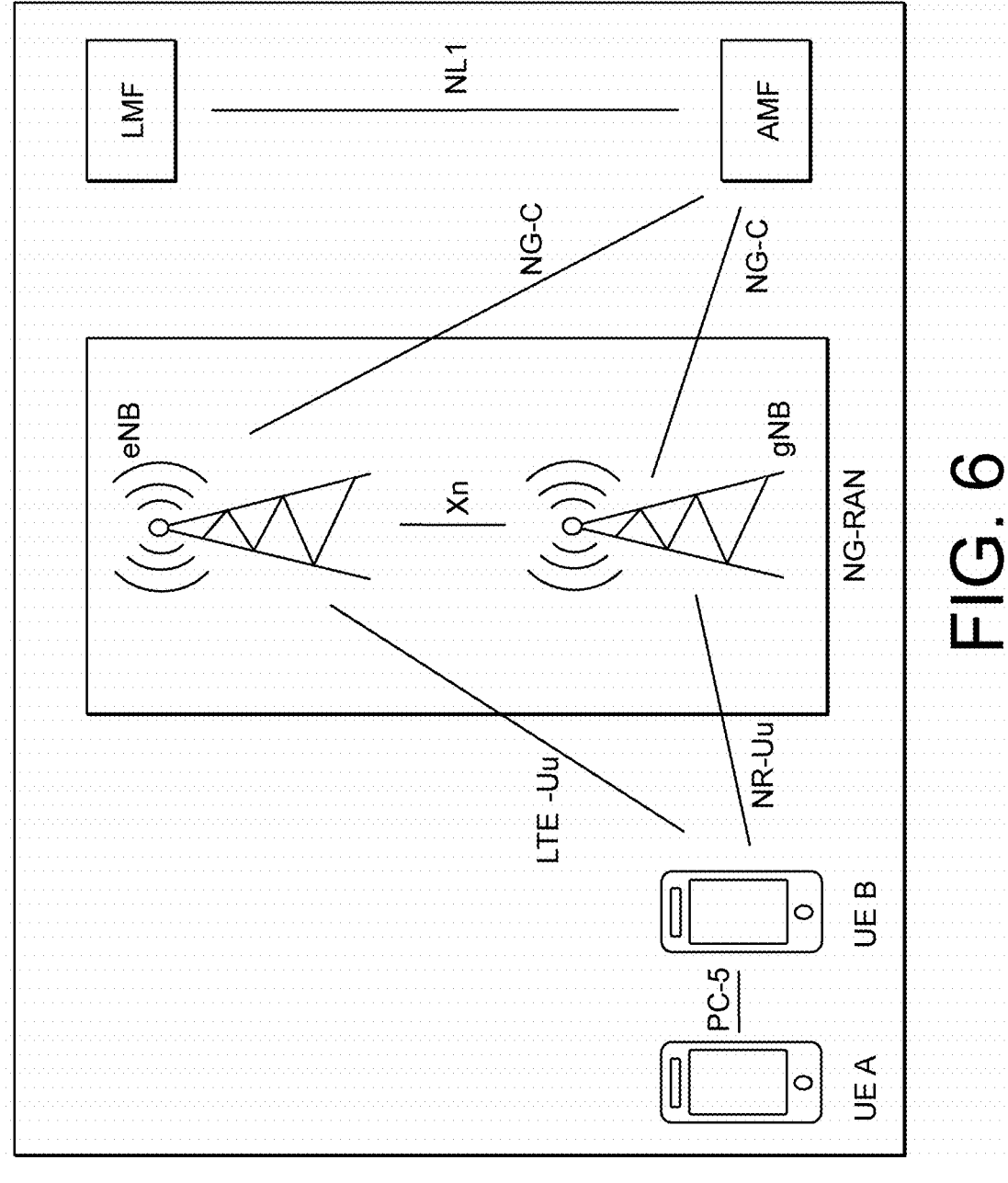
FIG. 6 illustrates a partial coverage scenario for SL positioning and ranging, in accordance with an embodiment of present invention.

FIG. 6 illustrates a partial coverage scenario for SL positioning and ranging, in accordance with an embodiment of present invention. Such architecture is similar to the legacy NR positioning architecture over a Uu link with the addition of a PC-5 link with UE which is not connected to the network unlike in the in-coverage chafe. The major entities include AMF and LMF configured within the 5G core, NG-RAN which can have at least gNB, ng-eNB, and/or eNB. The NG-RAN serves only the anchor UE while the target UE is out-of-coverage. The anchor UE can communicate with the target UE via the PC-5 interface. The LMF may communicate the positioning-related signaling to the out-of-coverage UE through the UE relay. The LMF may communicate with the target UE through the anchor UE which is acting as the relay. This is a UE to network relay and can be of L2 type or L3 type relay.

Figure 7:
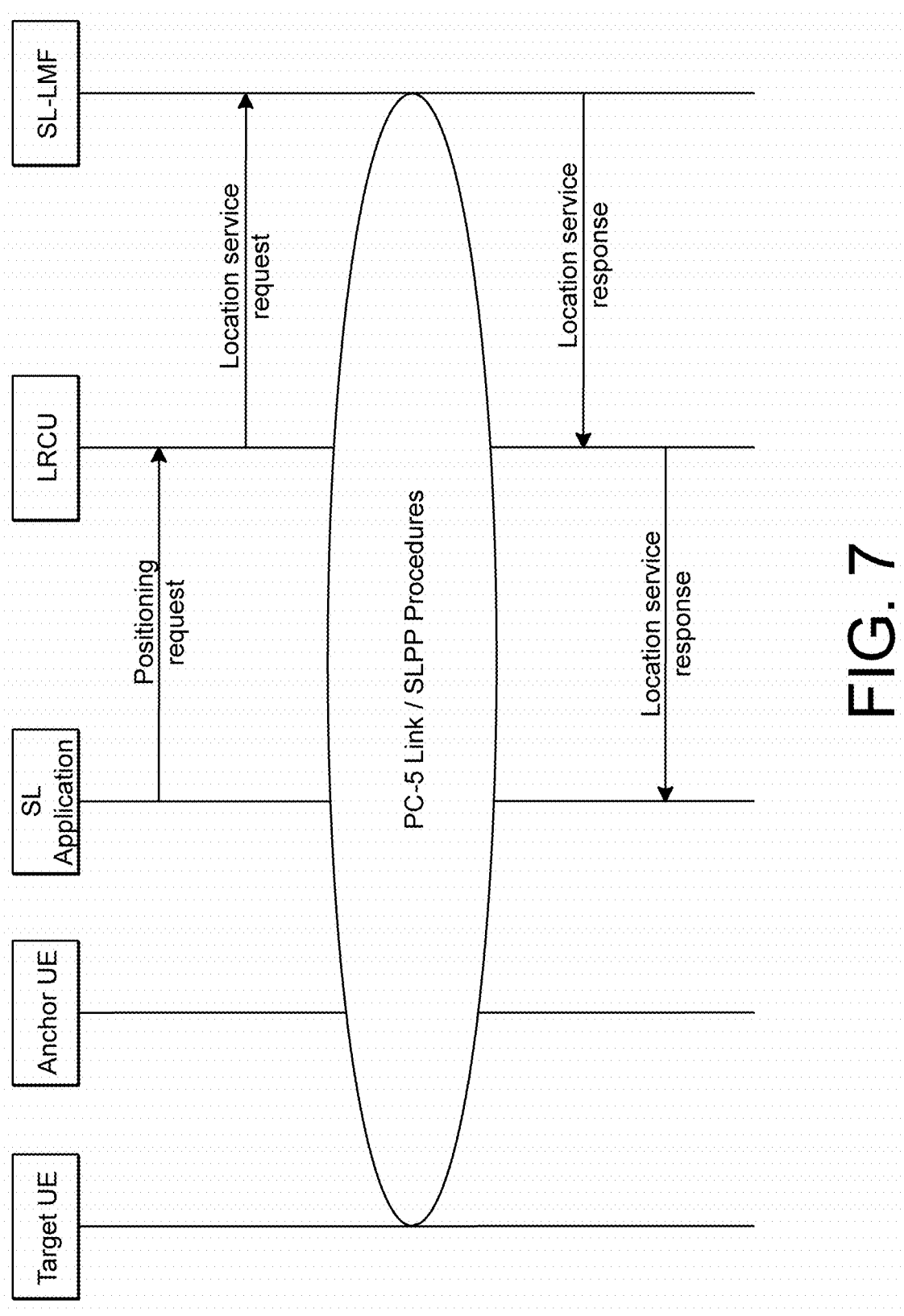
FIG. 7 illustrates signaling flow for SL positioning and ranging in the out-of-coverage scenario, in accordance with an embodiment of present invention.

FIG. 7 illustrates signaling flow for SL positioning and ranging in the out-of-coverage scenario, in accordance with an embodiment of present invention. The location service request can originate from the SL application function in the positioning server UE, the target UE, or the anchor UE. In another use case, the request may be generated by LRCU. The location service request is transferred to SL-LMF by the LRCU which will authenticate the request and find the SL-LMF entity capable of serving the request. The LMF instigates the location procedures with the positioning server UE, the target UE, and the anchor UE. SL-LMF communicated with all UE over side link positioning protocol (SLPP). A location service response is prepared by the SL-LMF and sends it to the LRCU along with additional results such as success or failure indication and a location estimate for the UE if requested and obtained. The LRCU returns the location service response and the location estimate of the UE to the entity where the original location service request came from.

Figure 8:
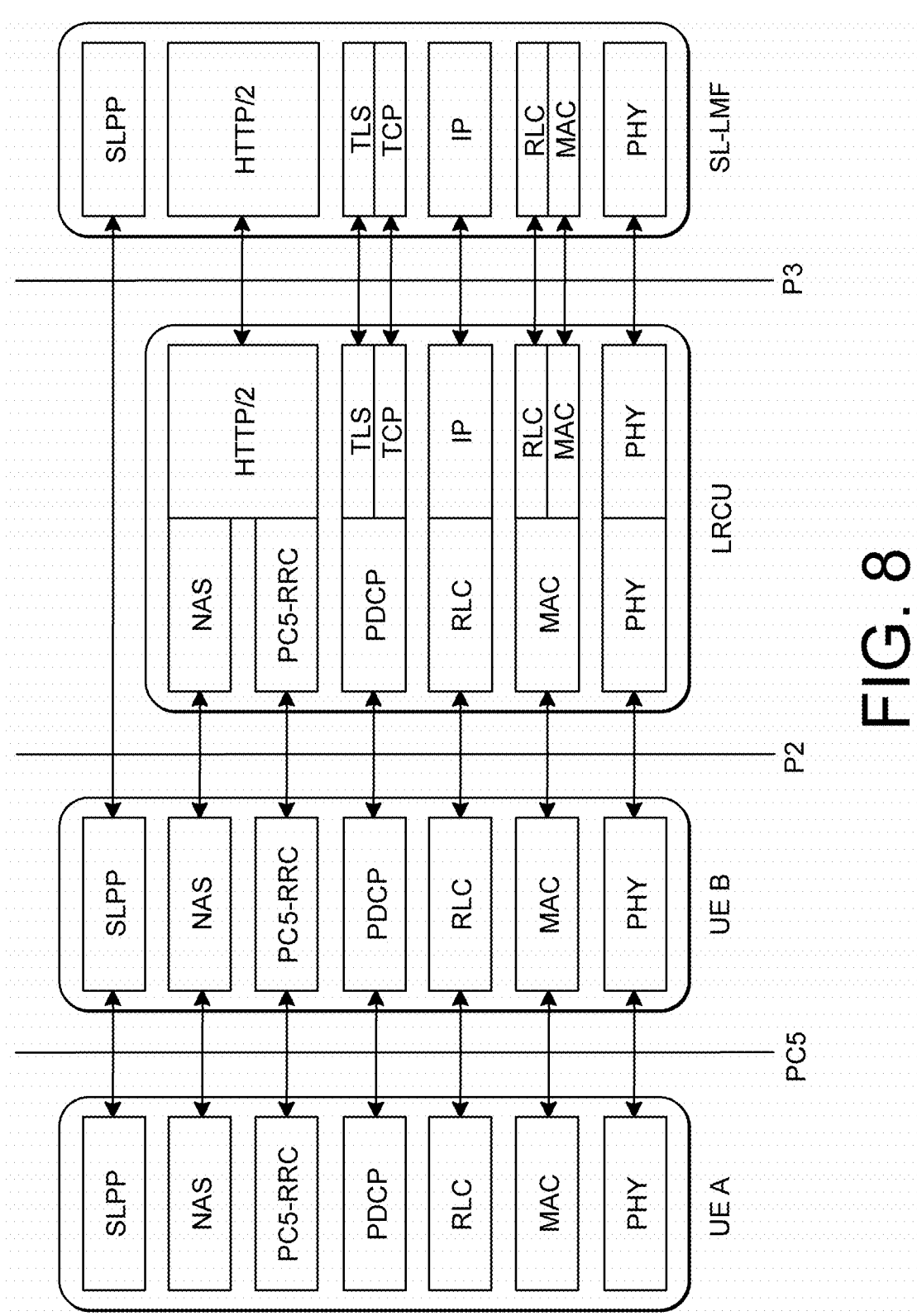
FIG. 8 illustrates a protocol layering structure for supporting transfer of SLPP messages between the SL-LMF and the UE in the out-of-coverage scenario, in accordance with an embodiment of present invention.

FIG. 8 illustrates a protocol layering structure for supporting transfer of SLPP messages between the SL-LMF and the UE in the out-of-coverage scenario, in accordance with an embodiment of present invention. For SL application triggered and LRCU triggered requests, SL-LMF needs to establish the SLPP connection with participating UEs i.e. target UE and anchor UE for the exchange of positioning signaling messages. SLPP PDU may be exchanged between the UE and the SL-LMF carrying positioning messages. This message is at least one of the capability messages, assistance information message, and location request message containing request location measurement and location information.

As shown in FIG. 8, the SL-LMF will contain a physical layer, MAC layer, radio link control (RLC) layer, internet protocol (IP layer), TCP & TLS layer, and HTTP/2 layer, and SLPP protocol resides on top. LRCU has a similar layer towards SL-LMF except SLPP to tunnel the SLPP towards the UEs. Further, in LCRU toward UE end, all side link PC5-S and/or PC5-RRC stack may be present to interact with the UE over the PC5 link. The SLPP PDU may be carried as PC5-S and PC5-RRC PDU over the PC5 interface. The UE will be side link capable and able to establish the PC-5 link with all UE in the vicinity. It will have a physical layer, MAC layer, RLC layer, PDCP layer, and PC5-RRC or PC5-S. SLPP in the SL-LMF will terminate in UE SLPP.

Figure 9:
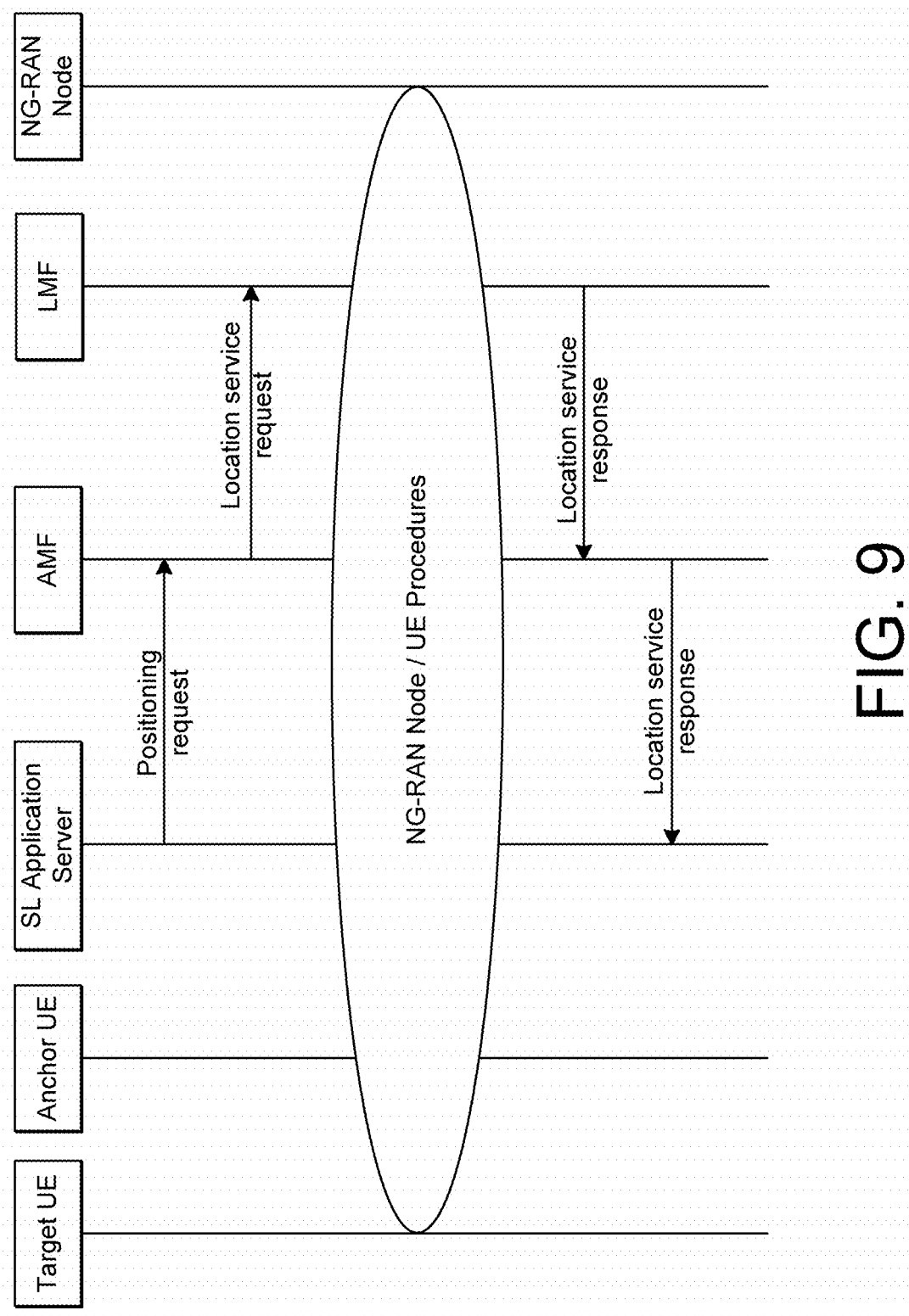
FIG. 9 illustrates signaling flow for SL positioning and ranging in the in-coverage and partial coverage scenarios, in accordance with an embodiment of present invention.

FIG. 9 illustrates signaling flow for SL positioning and ranging in the in-coverage and partial coverage scenarios, in accordance with an embodiment of present invention. The location service request can originate from the SL application function in the positioning server UE, the target UE, or the anchor UE. In another use case, the request may be generated by the AMF if the network wants the location information for internal purposes. The location service request is transferred to an LMF by the AMF. The AMF performs authentication and selection of the LMF before forwarding the request. The location procedures are instigated by the LMF with the serving and possibly neighboring gNB or ng-eNB in the NG-RAN. LMF will establish the connection with the target UE whose position is to be estimated as well as the anchor UE or assistant UE(s) who are helping NG-RAN and LMF to localize the target UE.

Anchor/assistant UEs and target UE will communicate over PC5 link the and perform the positioning measurements which are redirected towards LMF from individual UEs. A location service response is prepared by the LMF and sends it to the AMF along with additional results such as success or failure indication and a location estimate for the UE if requested and obtained. The AMF returns the location service response and the location estimate of the UE to the entity where the original location service request came from.

Figure 10:
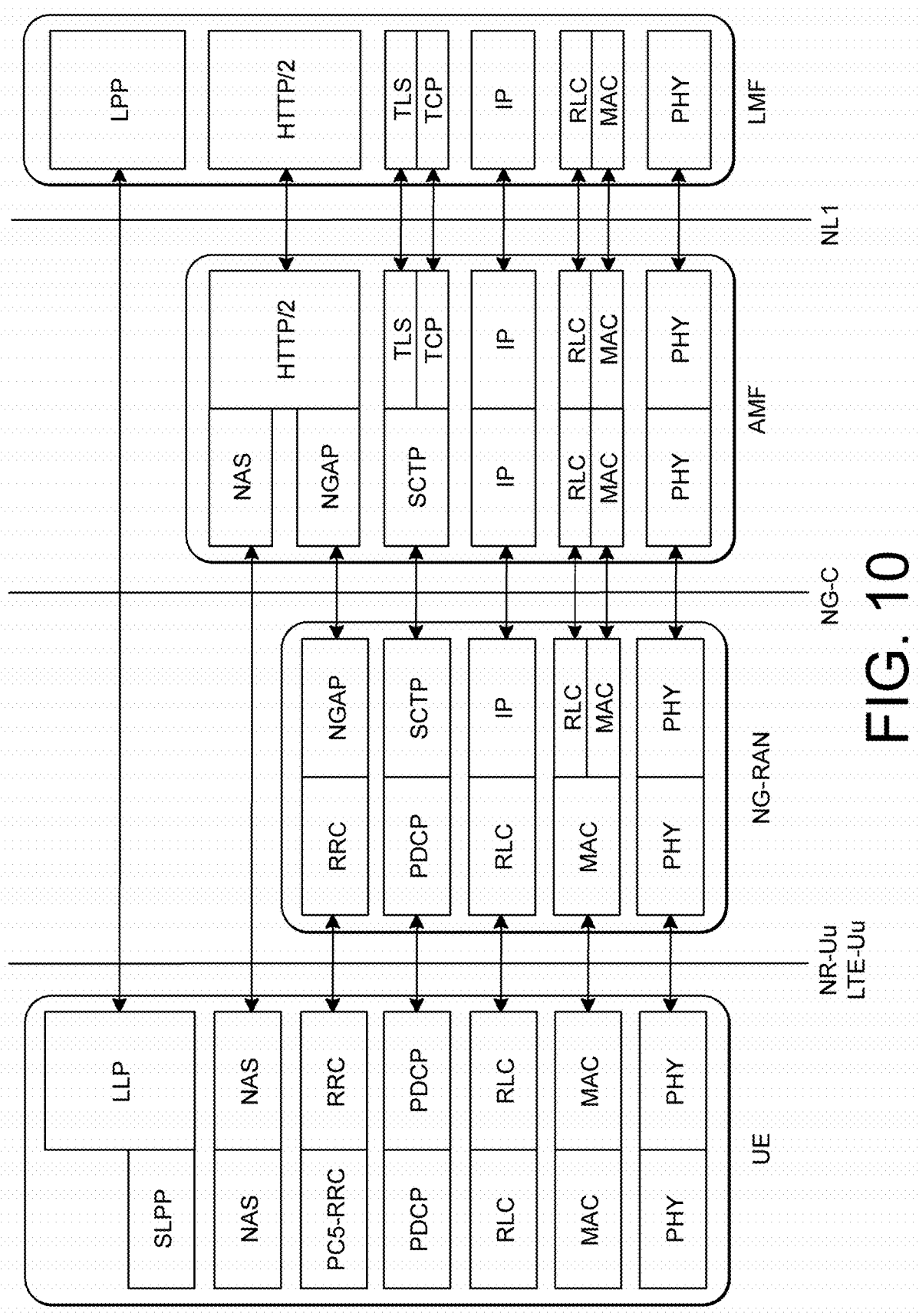
FIG. 10 illustrates a protocol layering structure for supporting transfer of LPP messages between an LMF and a UE in the in-coverage scenario, in accordance with an embodiment of present invention.

FIG. 10 illustrates a protocol layering structure for supporting transfer of LPP messages between an LMF and a UE in the in-coverage scenario, in accordance with an embodiment of present invention. The LPP PDU is carried in NAS PDU between the AMF and the UE. For network-triggered service requests, the LMF needs to send an LPP message to the UE as part of some LPP positioning activity. In case of a UE-triggered service request, the UE needs to send an LPP PDU to the LMF as part of some LPP positioning activity. AMF, LMF, and UE Uu link stack are similar to the NR positioning protocol stack. Additionally, UE will have a PC5 stack with SLPP to communicate the positioning measurements from the PC5 link to the Uu link. SLPP and LPP in this case may not be separate stacks but may be sub-part of LPP itself.

Signaling flow for SL positioning and ranging in the partial coverage scenario is shown in FIG. 9. The signaling flow is similar to in-coverage call flow except that one or more participating UE i.e. the target UE and the anchor UE is present out-of-coverage (say remote UE) and any location service request can originate from some entity in the network, for example from the serving AMF for a target UE, or from the anchor UE. The anchor UE communicates with the target UE via the PC-5 interface. The location service request is transferred to an LMF by the AMF. The location procedures are instigated by the LMF with the serving and possibly neighboring gNB or ng-eNB in the NG-RAN. The LMF can additionally or instead of the previous procedure instigate the location procedures with the anchor UE. A location service response is prepared by the LMF and sends it to the AMF along with additional results such as success or failure indication and a location estimate for the UE if requested and obtained. The AMF returns the location service response and the location estimate of the UE to the entity where the original location service request came from. Remote UE is receiving these messages from LMF as well through a relay node. The relay node can be an L2 type or L3 type UE-to-network relay. The protocol stack and interfaces are explained successively.

Figure 11:
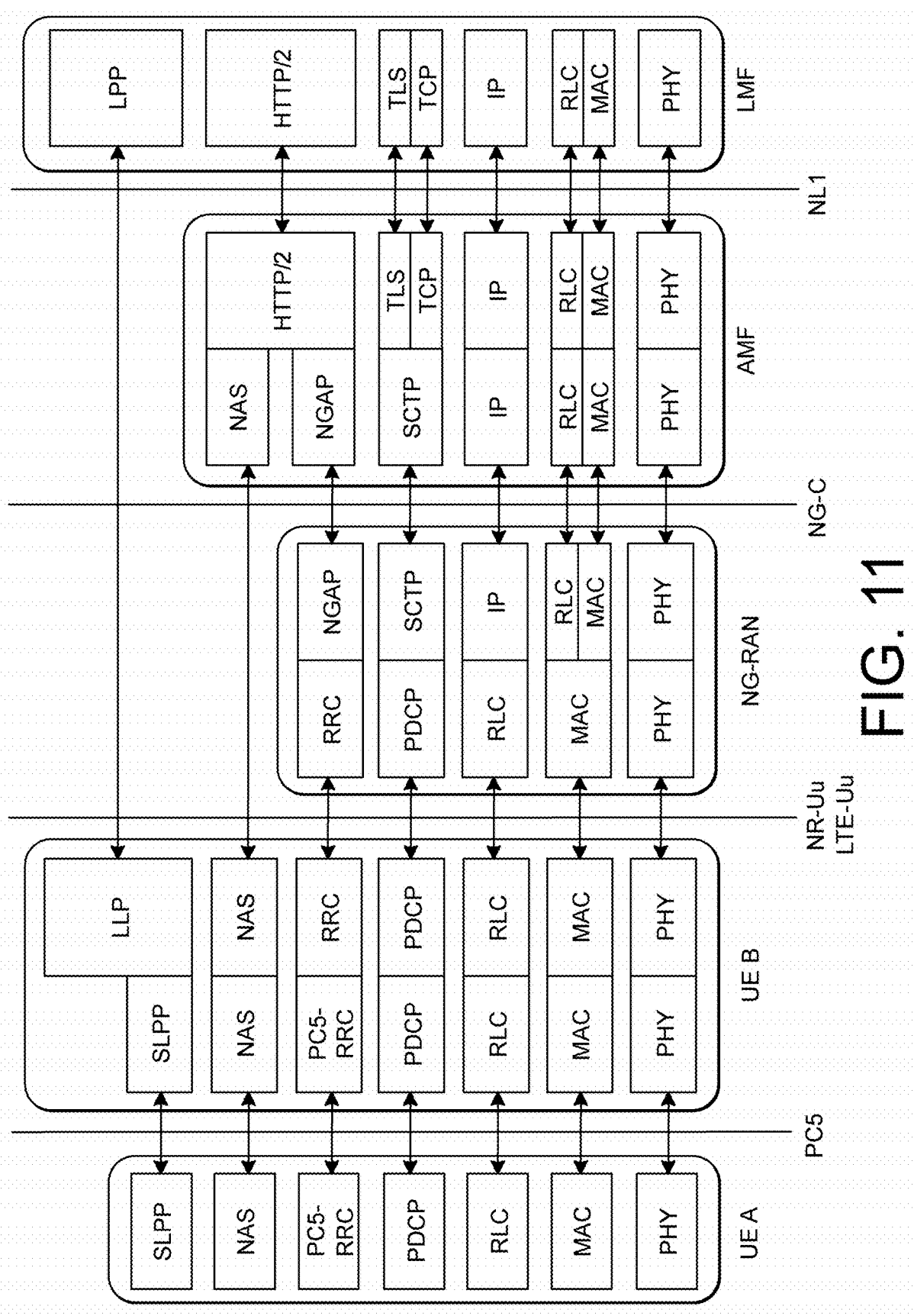
FIG. 11 illustrates a protocol layering structure for supporting transfer of LPP messages between an LMF and a remote UE through a relay UE in the partial coverage scenario, in accordance with an embodiment of present invention.

FIG. 11 illustrates a protocol layering structure for supporting transfer of LPP messages between an LMF and a remote UE through a relay UE in the partial coverage scenario, in accordance with an embodiment of present invention. The LPP PDU is carried in NAS PDU between the AMF and the relay UE. The relay UE takes the LPP PDU to the LPP layer, converts the LPP PDU into SLPP PDU, and forwards the SLPP PDU over the PC5 stack to the remote UE.

Figure 12:
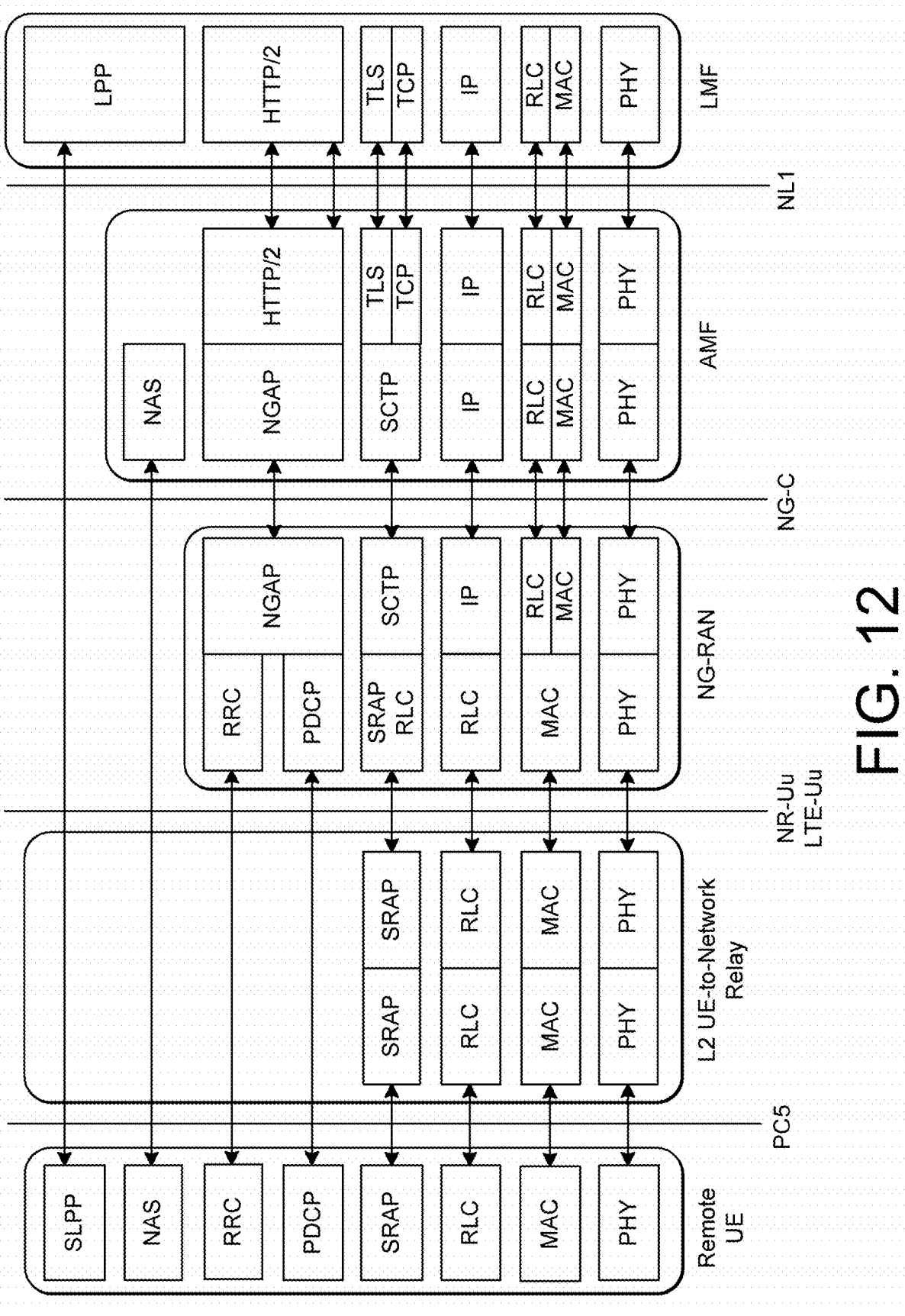
FIG. 12 illustrates a protocol layering structure for supporting transfer of LPP/SLPP messages between an LMF and a remote UE using an L2 UE-to-network relay unit in the partial coverage scenario, in accordance with an embodiment of present invention.

FIG. 12 illustrates a protocol layering structure for supporting transfer of LPP/SLPP messages between an LMF and a remote UE using an L2 UE-to-network relay unit in the partial coverage scenario, in accordance with an embodiment of present invention. The L2 UE-to-network relay unit is connected to NG-RAN. In this case, sidelink relay adaptation (SRAP) protocol layer relays the packets from the NGRAN PDCP layer to remote UE PDCP. The LMF tunnels the LPP messages to SLPP in remote UE, and thus, the LPP messages are compatible with SLPP. This can be done using the same LPP protocol with additional IEs related to SLPP or a separate ASN.1 module for LPP and SLPP in the LMF.

Figure 13:
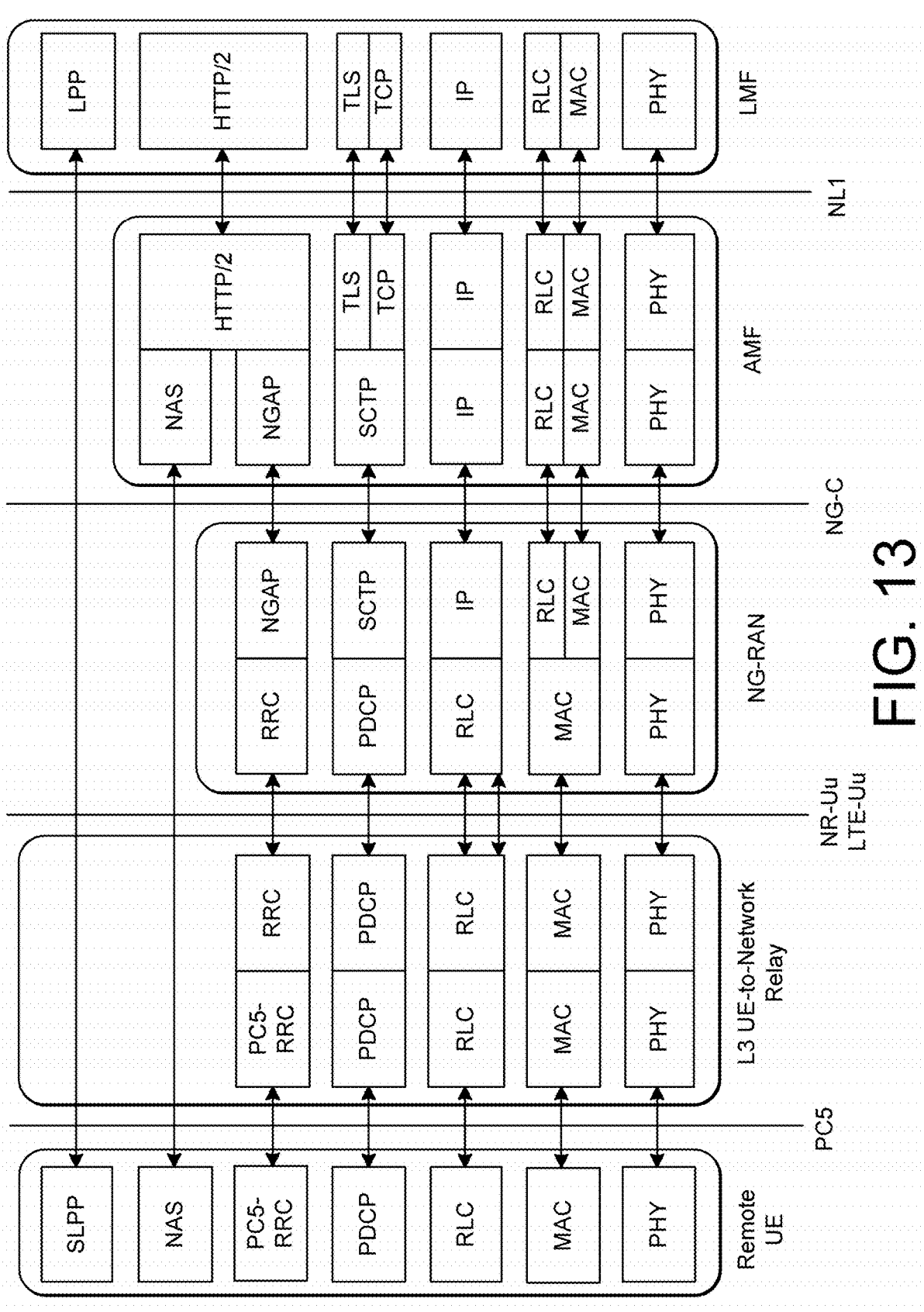
FIG. 13 illustrates a protocol layering structure for supporting transfer of LPP/SLPP messages between an LMF and a remote UE using an L3 UE-to-network relay unit in the partial coverage scenario, in accordance with an embodiment of present invention.

FIG. 13 illustrates a protocol layering structure for supporting transfer of LPP/SLPP messages between an LMF and a remote UE using an L3 UE-to-network relay unit in the partial coverage scenario, in accordance with an embodiment of present invention. The L3 UE-to-network relay unit is connected to NG-RAN. Further, the remote UE is connected to the NG-RAN via L3 UE-to-network relay unit, over PC-5 link. The PC5-RRC or PC-5 S layer relays the packets from LMF to the remote UE in this protocol. The L3 UE-to-network relay includes a control plane stack (shown in FIG. 13) or data plane stacks. In the UE-to-network relay, the LPP message may be terminated in the Uu link stack and the message is carried over the PC5 stack to exchange with the remote UE.

Positioning procedures in the side link are transmitted between UEs, SL-LMF to the UE, or LMF to the UE using the SLPP protocol. A positioning procedure consists of one or more operations including i) exchange of positioning capabilities, ii) transfer of assistance data, iii) transfer of location information including at least one of the positioning measurements and positioning estimates, iv) error handling, and v) abort. Detailed explanation of these operations is provided successively.

Multiple SLPP transactions can be initiated in parallel i.e., a new SLPP transaction may be initiated while another one is outstanding. Each message can be exchanged either in a session-based manner with a particular ID for each session or session-less manner with the best effort way. The session-based procedure is suitable for bidirectional message exchange between participating entities (UEs) and session-less is advantageous in broadcast/group cast way of communicating. Details related to each signaling procedure are provided below.

Figures 14A, 14B:
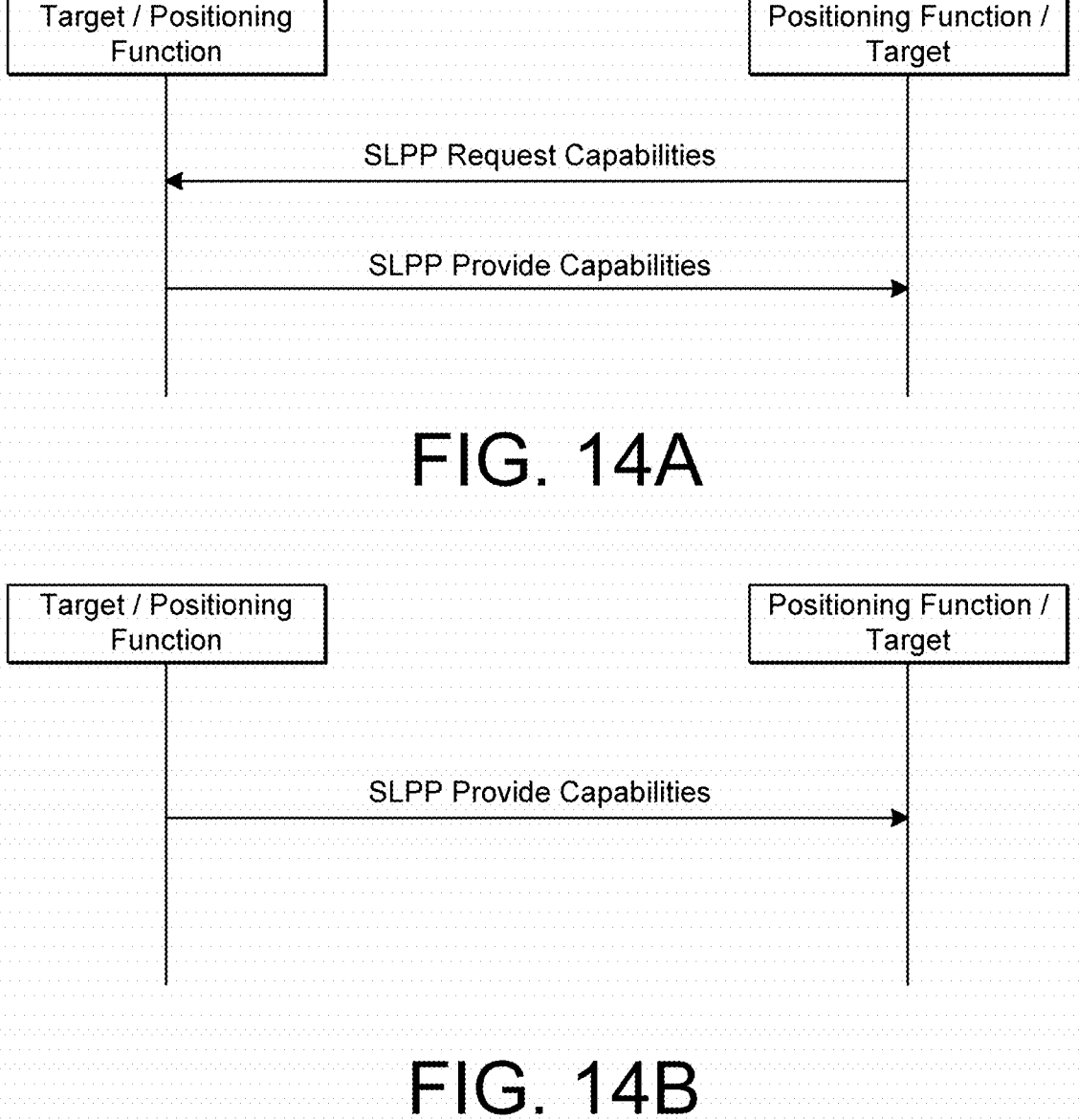
FIG. 14a illustrates SLPP capability transfer procedure, in accordance with an embodiment of present invention.
FIG. 14b illustrates SLPP capability indication procedure, in accordance with an embodiment of present invention.

FIG. 14a illustrates SLPP capability transfer procedure, in accordance with an embodiment of present invention. FIG. 14b illustrates SLPP capability indication procedure, in accordance with an embodiment of present invention. The exchange of capabilities between a target UE and/or anchor UE and an SL positioning server/SL-LMF may be initiated by sending a request from SL-LMF or UEs as unsolicited information. If a request is used, the SL-LMF sends an SLPP Request Capabilities message to the target device with a request for capability information. The target UE or the anchor UE sends an SLPP Provide Capabilities message back as a response. In another case, the target UE or the anchor UE transfers capability in unsolicited manner to the SL-LMF. The capability information can be requested in a broadcast, group cast, or unicast manner. The response can be provided as a broadcast, groupcast, or unicast manner. The capability message may include message segmentation capability, positioning RS processing capability, PC5 capability, positioning server capability, UE relay capability including L2 and L3 type, positioning methods supported, maximum frequency layer supported, sidelink band combination supported, supported bandwidth, supported SCS, PRS processing duration, maximum PRS configuration can be handled, FR1/FR2 support, PRS buffer types, QCL capabilities, etc.

Figures 15A, 15B:
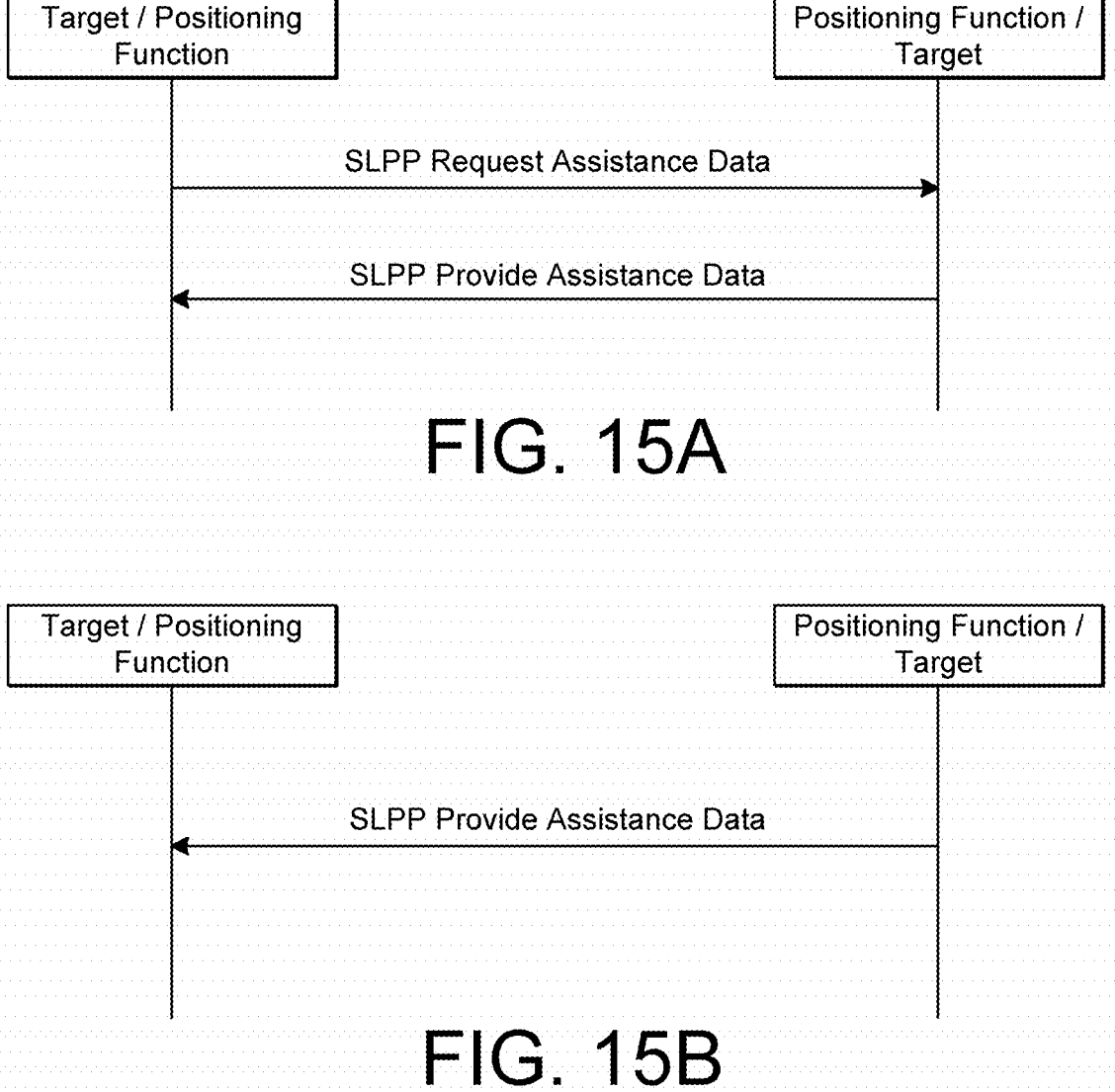
FIG. 15a illustrates SLPP assistance data transfer procedure, in accordance with an embodiment of present invention.
FIG. 15b illustrates SLPP assistance data delivery procedure, in accordance with an embodiment of present invention.

FIG. 15a illustrates SLPP assistance data transfer procedure, in accordance with an embodiment of present invention. FIG. 15b illustrates SLPP assistance data delivery procedure, in accordance with an embodiment of present invention. Assistance data may be transferred either by request or unsolicited. Assistance data delivery is supported only via unicast, broadcast, or group cast transport from SL-LMF to target UE/anchor UEs. The target UE/anchor UE may send a request to the SL-LMF for assistance data and may indicate the particular assistance data needed. The server transfers assistance data to the target UE/anchor UEs. The transferred assistance data should match any assistance data requested by target UE/anchor UEs. The server may transfer additional assistance data to the target UE/anchor UEs in one or more additional SLPP assistance provide messages. In another case, the SL-LMF may transfer capability in unsolicited manner to SL-LMF as well if required.

In one implementation, the assistance information may include physical cell IDs (PCIs), global cell IDs (GCIs), and TRP IDs of candidate NR TRPs for the measurements in scenario 2, assisting UE Ids of candidate assisting UEs used for the measurements, reference assisting UE node, positioning server UE ID, session ID, an indication of session less operation, assisting UE/TRP locations, positioning reference (local or global), synchronization offsets between the reference node and assisting nodes, set of PRS configurations, set of reporting configurations, periodic or aperiodic measurement reporting information, the trigger for measurements, time window for measurement, time stamp of the measurement, and integrity protection parameter for measurements.

Figures 16A, 16B:
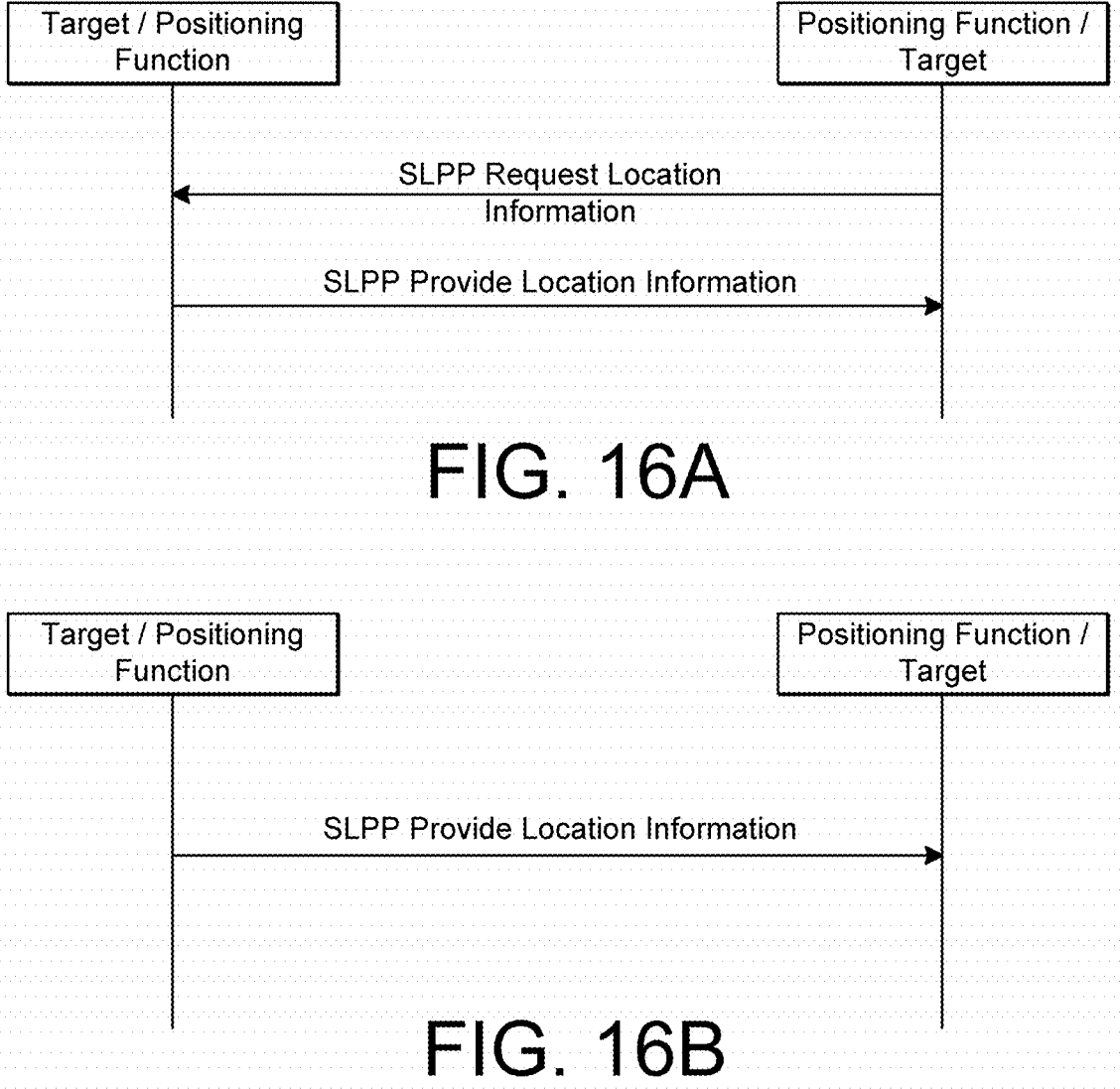
FIG. 16a illustrates SLPP location information transfer procedure, in accordance with an embodiment of present invention.
FIG. 16b illustrates SLPP location information delivery procedure, in accordance with an embodiment of present invention.

FIG. 16a illustrates SLPP location information transfer procedure, in accordance with an embodiment of present invention. FIG. 16b illustrates SLPP location information delivery procedure, in accordance with an embodiment of present invention. SL location information may include positioning estimates, positioning measurements, and transfer SL-PRS. The SL-LMF may send a request for location information to the target UE/anchor UE and may indicate the type of location information needed and associated QoS. If the request is to transfer SL-PRS, the SL-LMF may expect acknowledgment with additional configuration information apart from information conveyed over assistance information. In response, the target UE/anchor UE sends transfer location information to the SL-LMF depending on the type of request. The location information transferred should match with the location information requested. The target UE/anchor UE may transfer additional location information to the SL-LMF in one or more additional SLPP provide request messages. The SLPP location information delivery procedure may be used for unilateral location information transfer.

SLPP procedures are not required to occur in any fixed order, in order to provide greater flexibility in positioning. For example, a UE may request assistance data at any time to comply with a previous request for location measurements will include, physical cell IDs (PCIs), global cell IDs (GCIs), and TRP IDs of candidate NR TRPs for the measurements in scenario 2, assisting UE Ids of candidate assisting UEs used for the measurements, reference assisting UE node, assisting UE/TRP locations, positioning reference (local or global), synchronization offsets between the reference node and assisting nodes, set of PRS configurations, set of reporting configurations, periodic or a periodic measurement reporting information, the trigger for measurements, time window for measurement, time stamp of the measurement, and integrity protection parameter for measurements from the SL-LMF. Location information may vary based on selected positioning method, and type of positioning may be UE based where positioning estimate is carried out at target UE or receiving UE whereas UE-assisted positioning where receiving UE/node will provide measurement to the Tx node/UE or positioning server/LMF.

Figure 17:
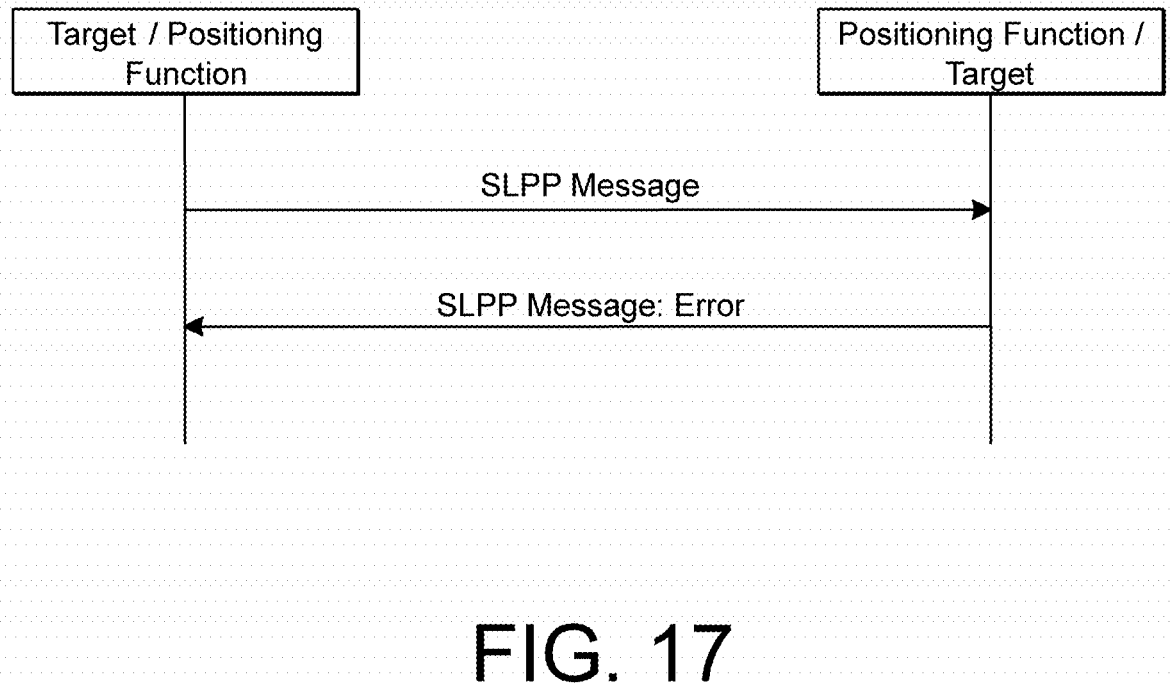
FIG. 17 illustrates an error handling procedure in SLPP, in accordance with an embodiment of present invention.

FIG. 17 illustrates an error handling procedure in SLPP, in accordance with an embodiment of present invention. This procedure is used to notify a sending endpoint by the receiving endpoint that the receiving SLPP message is erroneous or unexpected. This procedure is bidirectional at the SLPP level i.e. either the UE or the SL-LMF may take the role of either endpoint.

Figure 18:
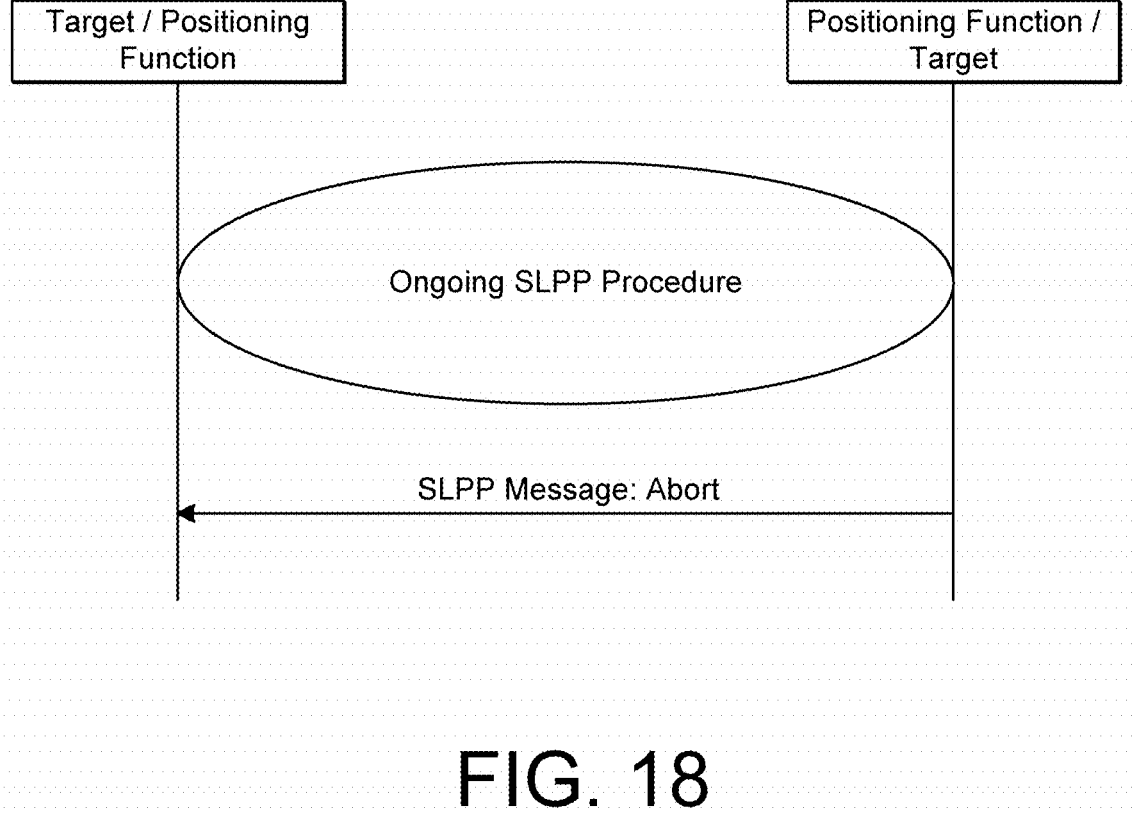
FIG. 18 illustrates an abort procedure in SLPP, in accordance with an embodiment of present invention.

FIG. 18 illustrates an abort procedure in SLPP, in accordance with an embodiment of present invention. This procedure is used to notify another endpoint by one endpoint to abort an ongoing procedure between them i.e. the two endpoints. This procedure is bidirectional at the SLPP level, either the UE or the SL-LMF may take the role of either endpoint.

The methods supported by sidelink positioning can be broadly categorized as time-based methods, angle-based methods, and phase-based methods. The time-based method includes Sidelink Time difference of arrival (SL-TDOA), Sidelink multi-round trip time (SL-mRTT) angle-based methods including Sidelink Angel of Arrival (SL-AoA), and Sidelink Angle of Departure (SL-AOD), and the phase-based method includes carrier phase-based positioning method.

In SL-TDOA, LMF/positioning server/anchor UE may configure assisting UEs and a target UE in a complementary direction to receive the PRS over the sidelink. In one case the LMF/positioning server/anchor UE may configure the assisting UE to transmit at least one PRS sequence in a preconfigured PRS resource known to the target UE. The target UE may receive the PRS and measure a reference signal time (RST) or a reference signal time difference (RSTD). The RSTD will be measured as the difference between the RST of assisting UE subtracting it from the RST from reference assisting UE/TRP. Target UE can perform more than one measurement of RSTD/RST which may be corresponding to multiple paths including LOS paths and NLOS paths, same path but over different instances in time, a group of clutters/paths, etc. The target UE may measure the angle of arrival (AoA), received signal strength (RSRP), LOS probability, and a timestamp corresponding to each RSTD/RST. One or more of these measurements may be reported to the LMF using provide LocationInformation message.

In another case, the LMF/positioning server/anchor UE may configure the target UE to transmit the PRS to assisting UEs. Each assisting UE may receive the PRS following the same procedure as the target UE, as explained above.

The assisting UE and the target UE may expect assistance information from the LMF through the anchor UE or from the anchor UE itself. Such expected assistance information may include, PCIs, GCIs, assisting UEID/TRP IDs of candidate assisting UEs or TRPs, reference UE/TRP node, PRS configuration of candidate corresponding to each assisting UE, QCL information with other RS from each assisting UE, the geographical coordinate of other assisting UEs or target UE, synchronization information with reference.

Positioning request messages may be received from the LMF/positioning server/anchor UE and may include measurement quantity (RSTD/RST) to measure or report quantities to be reported along with RSTD/RST e.g., RSRP, AoA, and LOS/NLOS probability, reporting configurations, time window, and measurement expected window.

The assisting UEs or the target UE will use information in the request message to report RSTD/RST measured LMF through the anchor UE. Such information may include at least measurement quantity (RSTD/RST), corresponding RSRP, AoA, and LOS/NLOS indicator, assumed reference UE ID, the integrity of measured RSTD/RST, used reference coordinates, and positioning estimate.

In SL-multi-RTT positioning method, the target UE position is estimated based on measurements performed at both sides i.e. assisting UEs and target UE. The measurements performed at assisting UEs and target UE are assisting/target UE Rx-Tx time difference measurements (and optionally DL-PRS-RSRP and UL-SRS-RSRP) of DL-PRS and UL-SRS. A measured Rx-Tx time difference is used by an LMF to determine the RTTs.

The LMF/positioning server/anchor UE will configure the assisting UEs and target UE necessary assistance information, positioning method as SL-m-RTT, and required resource allocation of PRS with time stamping, the assisting UEs and target UE are configured in a complementary direction to receive the PRS over sidelink. The first time, instant/stamp assisting UE will transmit the PRS over predefined resource in time and frequency and receive the other PRS from target UE in the second time instant/stamp. The difference between Tx and Rx time between the first PRS and second PRS will give UE Rx-Tx time difference measurements. This can be performed over one or more Tx beams from the same UE (assisting or target) and can be present over one or more channel paths. This measurement is reported to the LMF through anchor UE using provide LocationInformation configuration provided by the LMF to the assist or target UE. LMF/positioning server/anchor UE will pair UE Tx-RX time difference at one or more assisting UE with the target using QCL assumptions, Tx-Rx beam pair hypothesis, and reported RSRP for UE RX-TX time difference. Using this one or more information, the LMF may perform the positioning/localization of the target UE.

The anchor UE may need the PRS allocation information from assisting UEs and/or the target UE. The anchor UE may request the PRS allocation information using a positioningInformationRequest message. Upon receiving, the UE will reply back to the PRS configuration using the positioningInformationResponse message. The reply message may include PRS type (SL-SSB, CSI-RS, or SL-PRS), allocation resources in time and frequency, repetition count, sequence properties like initial value, cyclic shift or base sequence, the power offset with respect to a predefined transmission known to the anchor and assisting/target UE. Using this information at LMF/positioning server/anchor UE, it will configure the assisting UEs and target UE for RTT measurements.

In SL-AoA method of positioning, the angle of arrival is measured at receiving node. This can be assisting UEs, or a target UE based on the direction of transmission of PRS configured at respective nodes by the LMF/positioning server/anchor UE. The assisting UEs and the target UE are configured in complementary directions to receive the PRS over the sidelink. A transmitting UE will choose the beam to transmit the PRS to the receiving UE. For illustration, let's consider assisting UEs are transmitting PRS, and the target UE is receiving PRS. One or more assisting UEs will transmit one or more PRS over predefined beams. The target UE receive at least one PRS configured for it and will perform the AoA measurement. The target UE performs PDP estimation over the channel estimated using PRS and then interpolate it over resources (time and frequency) where PRS is not transmitted. Using one or more taps in the PDP and parameters of antennas at reception SL-AoA are estimated. Antenna parameters may include antenna spacing, antenna pattern, beamwidth, and antenna power per element. Receiving UE (target UE) will be configured with parameters related to transmitting (assisting) UEs by LMF. This information will be gathered by LMF using positioningInformationRequest and the UEs will respond to LMF requests with positioningInformationResponse.

In SL-AoD method of positioning, the angle of departure is measured at the transmission node or LMF/positioning server/anchor UE by using measurements reported by receiving UEs. Measurement reporting UEs can be assisting UEs or a target UE based on the direction of transmission of PRS configured at respective nodes by the LMF/positioning server/anchor UE. The assisting UEs and target UE are configured in a complementary direction to receive the PRS over the sidelink. A transmitting UE may choose multiple beams to transmit one or more PRS per beam to the receiving UE.

In one exemplary situation, assisting UEs may be transmitting a PRS, and a target UE may be receiving the PRS. One or more assisting UEs will sweep the spatial dimension in zenith and azimuth directions with redefined angles. The sweeping pattern may depend on the number of antennas, antenna type, bore sight, beam width, and beamforming capability. The target UE will receive at least one PRS configured for it and will perform power measurements over one or more paths. Power measurement will be in terms of RSRP, RSSI, and/or SNR. The target UE performs these measurements per beam per assisting UE. It may be configured to report associated AoA. This may be used for LoS confidence estimation. The target UE will report back the one or more best beams using predefined criteria provided by either LMF/positioning server/anchor UE or decided by own. LMF/positioning server/anchor UE will use this information to estimate the AoD. Receiving UE (target UE) will be configured with parameters related to transmitting (assisting) UEs by LMF. This information will be gathered by LMF using positioningInformationRequest and UEs will respond to LMF requests with positioningInformationResponse.

In SL carrier phase method, LMF/positioning server/anchor UE will configure to report the carrier phase measurement from target UE or configure target UE to send SL-PRS to measure carrier phase to measure the time of flight and it is used to measure the positioning of the target UE. This measurement can be used along with the time-based method and angle-based method as an additional measurement in the previously mentioned methods.

Successively, the details related to design of Sidelink Positioning Reference Signal (SL-PRS) are provided. For sidelink positioning, the SL-PRS is transmitted from a Tx UE to an Rx UE. In one case, the Tx UE will be anchor UE or assisting UEs which are assisting anchor to localize the target. In another case, the target UE will transmit the PRS to anchor and assisting UEs. The sequence used for PRS is a pseudo-random sequence. It is preferable to have staggered pattern for better positioning related measurement even in sidelink case. The SL-PRS sequence can be given as follows:

$$r_{slprs}(m) = \frac{1}{\sqrt{2}}(1 - 2c(2m)) + j\frac{1}{\sqrt{2}}(1 - 2c(2m+1))$$

Further, the SL-PRS sequence is initialized as, $$c_{init} = \left(2^x\left(N_{symb}^{slot}n_{s,f}^\mu + l_{SL\text{-}PRS} + 1\right)(2n_{ID} + 1) + n_{ID}\right)$$

In above mentioned equation, $c_{init}$ provides an initial seed for pseudo random sequence generation, $n_{ID}$ provides the UE specific identification embedded in the sequence which is used to define the association of received PRS and transmitting UE. In sidelink transmission, $n_{ID}$ can be configured based on CRC of the corresponding PSCCH triggering the SL-PRS. CRC will be of 24-bit or 8-bit or 12-bit sequence and the same sequence or a part of the sequence can be used for defining the $n_{ID}$. The x factor in exponent is an arbitration factor.

The SL-PRS physical resources may be present in time domain and frequency domain. The SL-PRS will be filled in the sidelink slot over RBs and symbols within slot in the subchannel selected or configured. Mapping of the resource's elements of SL-PRS is given as below:

$$r_{k\_slprs,l\_slprs}^{(p,\mu)}(m) = \beta_{slprs}r_{slprs}(m)$$

$$m = 0, 1, 2, \ldots$$

In above equation, $\beta_{slprs}$ is power control offset, $r_{slprs}(m)$ is SL-PRS sequence, p is SL-PRS port, and $\mu$ is SL-PRS numerology.

Figure 19:
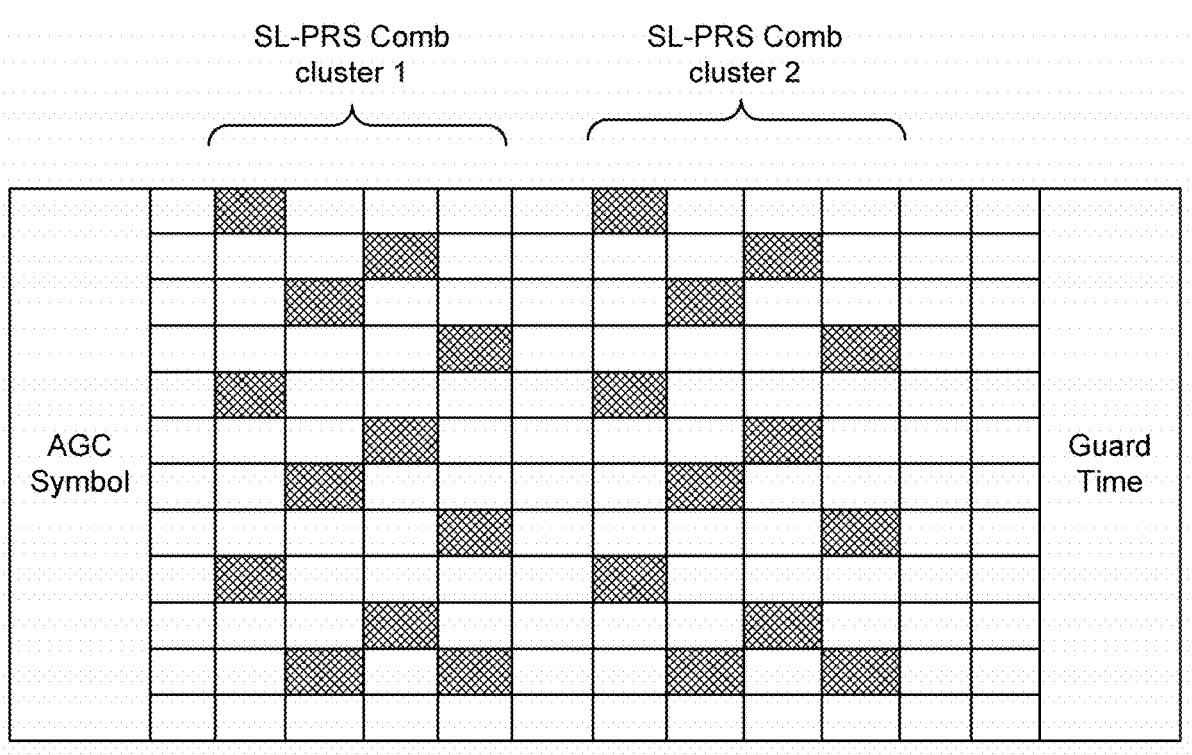
FIG. 19 illustrates SL-PRS configuration in term of time and frequency, in accordance with an embodiment of present invention.

In frequency domain, different options are used for SL-PRS comb pattern. There are fully staggered SL-PRS pattern where number of repetitions of SL-PRS symbol equal to comb factor, partially staggered SL-PRS pattern where number of repetitions of SL-PRS symbol less than comb factor, and unstaggered SL-PRS patterns with same RE offset used across number of repetitions. A full staggered pattern is important for accurate positioning measurements in different channel conditions and for better link gain and coverage. Further, in V2X case, it is important to track the motion of vehicle in case as V2X UE velocity will be fairly large like 140 Km/Hr considered in study for highway case. Therefore, it is important to have phase tracking property in the SL-PRS inherently by design. It will be beneficial to have repetition of full staggered pattern configuration within the slot at least two times. For example, for comb 4 SL-PRS, 4 symbol repetition will provide fully staggered pattern. Such pattern (SL-PRS comb cluster) can be repeated one more time to have 8 symbol repetition, as shown in FIG. 19 illustrating SL-PRS configuration in terms of time and frequency.

For the configured comb pattern and number of repetitions, the frequency domain resource can be provided by the below equation:

$$k\_slprs = mK_{comb}^{SL\text{-}PRS} + \left(\left(k_{offset}^{SL\text{-}PRS} + \acute{k}\right)\bmod K_{symb}^{SL\text{-}PRS}\right)$$

In above equation, $$K_{comb}^{SL\text{-}PRS}$$

is a possible comb pattern. At least comb pattern N=2, 4, 6, 12 should be supported, $$k_{offset}^{SL\text{-}PRS}$$

is the resource-element offset $$\left\{0, 1, \ldots, K_{comb}^{SL\text{-}PRS} - 1\right\}.$$

$\acute{k}$ is a relative offset as function of symbol $l_{slprs}$

In time domain, SL-PRS location can be provided from a close set given below, $$l_{slprs} = \left[l_{start}^{SL\text{-}PRS}, l_{start}^{SL\text{-}PRS} + M\right]$$

In above equation, $$l_{start}^{SL\text{-}PRS}$$

is start of the symbol in the slot and M is max number of repetitions configured.

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

We claim:

1. A method of Side-Link positioning, the method comprising:

receiving, by at least one first node, at least one location service request from at least one first entity for estimating a location of at least one fourth node, wherein the at least one first entity is at least one of at least one second node, at least one fourth node, at least one external application connected to the at least one first node, at least one internal application connected to one of the at least one first node and the at least one fourth node, at least one Access and Mobility Management Function (AMF), at least one Location Request and Control Unit (LRCU), and at least one SL positioning server;

establishing, by the at least one first node, a communication link with at least one of the at least one second node, at least one third node, and the at least one fourth node, wherein the at least one second node and the at least one fourth node lies in one of in-coverage region, partial-coverage region, and out-of-coverage region of the at least one first node, wherein the communication link is established using at least one of side link positioning protocol (SLPP), LTE positioning protocol, NR positioning protocol annex (NRPPa), LTE positioning protocol annex (LPPa), ranging & Sidelink positioning protocol (RSPP) over at least one of PC5, Uu, and NG link;

estimating, by the at least one first node, the location of the at least one fourth node using location identification procedures involving at least one of the at least one second node, the at least one third node, and the at least one fourth node based on the at least one location service request; and transmitting, by the at least one first node, at least one location service response to the at least one first entity, wherein the at least one location service response comprises the location of the at least one fourth node and at least one additional result related to the location.

2. The method claimed in claim 1, wherein the at least one fourth node is one of the at least one first node, the at least one second node, the at least one third node, and at least one node specified in the location service request.

3. The method as claimed in claim 1, wherein the location identification procedures further comprise exchanging, by the at least one first node, at least one positioning signaling message with at least one of the at least one second node, the at least one third node, and at least one fourth node.

4. The method as claimed in claim 3, wherein the at least one first node exchanges the location procedure with at least one of the at least one fourth node and at least one second through at least one intermediate node, and wherein the at least one intermediate node is one of the at least one second node and the at least one fourth node.

5. The method as claimed in claim 3, wherein exchanging at least one positioning signaling message is performed using SLPP Packet data Unit (PDU) when the at least one second node and the at least one fourth node lies in the out-of-coverage region.

6. The method as claimed in claim 3, wherein the at least one positioning signaling message comprises at least one of capability message, assistance information message, location request message, abort message, and error message.

7. The method as claimed in claim 6, wherein the location request message comprises at least one of request location measurement and location information.

8. The method as claimed in claim 1, wherein the at least one first node comprises of a physical layer, Media Access Control (MAC) layer, Radio Link Control (RLC) layer, Internet Protocol (IP layer), Transmission Control Protocol (TCP) layer, Transport Layer Security (TLS) layer, Hypertext Transfer Protocol (HTTP)/2 layer, LTE positioning protocol (LPP) layer, and SLPP layer.

9. The method as claimed in claim 1, wherein the at least one second node and the at least one fourth node comprises of a physical layer, MAC layer, RLC layer, Packet Data Convergence Protocol (PDCP) layer, one of PC5-Radio Resource Control (RRC) layer and SDAP, one of the SLPP layer and the LPP layer.

10. The method as claimed in claim 1, further comprising:

receiving, by the at least one LRCU, the at least one location service request from the at least one second entity; and authenticating and forwarding the at least one location service request to the at least one first node when the at least one second node and the at least one target node lies in the out-of-coverage region.

11. The method as claimed in claim 1, further comprising:

receiving, by the at least one LRCU, the at least one location service response from the at least one first node; and forwarding the at least one location service response to the at least one second entity when the at least one second node and the at least one fourth node lies in out-of-coverage region.

12. The method as claimed in claim 11, wherein the at least one second entity is at least one of at least one second node, at least one fourth node, at least one external application connected to the at least one first node, at least one internal application connected to one of the at least one first node and the at least one target node, at least one Access and Mobility Management Function (AMF), at least one Location Request and Control Unit (LRCU), and at least one SL positioning server.

13. The method as claimed in claim 1, wherein the at least one LRCU comprises of at least one of a physical layer, MAC layer, RLC layer, IP layer, TCP layer, TLS layer, HTTP/2 layer, LTE positioning protocol (LPP) layer, and SLPP layer for communicating with the at least one first node.

14. The method as claimed in claim 1, wherein the at least one LRCU comprises a physical layer, MAC layer, RLC layer, PDCP layer, and one of PC5-RRC layer and SDAP for communicating with the at least one second node and the at least one fourth node.

15. The method as claimed in claim 1, wherein the at least one AMF authenticates and forwards the at least one location service request to the at least one first node when the at least one second node and the at least one fourth node lies in the in-coverage region and the partial-coverage region on receiving the at least one location service request.

16. The method as claimed in claim 1, wherein the at least one AMF receives the at least one location service response from the at least one first node and forwards the at least one location service response to the at least one entity when the at least one second node and the at least one fourth node lies in the in-coverage region and the partial-coverage region.

17. The method as claimed in claim 15, wherein at least one AMF comprises of a physical layer, MAC layer, RLC layer, IP layer, TCP layer, TLS layer, HTTP/2 layer for communicating with the at least one first node, and the least one AMF comprises of the physical layer, the MAC layer, the RLC layer, PDCP layer, RRC layer and SDAP for communicating with the at least one second node and the at least one fourth node.

18. The method as claimed in claim 1, wherein the at least one additional result comprises at least one of a location quality of the service (QOS) and one of success and failure indication of location estimation of the at least one fourth node.

19. The method as claimed in claim 1, wherein the at least one third node performs a relaying operation of the location procedure between the at least one first node and at least one of the at least one second node and the at least one fourth node.

20. The method as claimed in claim 1, wherein the at least one first node exchanges at least one of LPP PDU, SLPP PDU and SLPP PDU inside LPP PDU with at least one of the at least one second node, the at least one third node and the at least one target node for carrying the at least one positioning signaling message in a Non-Access Stratum (NAS) PDU when the at least one second node and the at least one fourth node lies in the in-coverage region.

21. The method as claimed in claim 1, wherein the at least one first node exchanges at least one of LPP PDU, SLPP PDU, and SLPP PDU inside LPP PDU with at least one of the at least one second node and the at least one third node for carrying the at least one positioning signaling message in the NAS PDU when the at least one second node and the at least one fourth node lies in the partial-coverage region.

22. The method as claimed in claim 21, wherein the at least one second node converts the LPP PDU into the SLPP PDU and forwards the SLPP PDU to the at least one fourth node over the PC5 link.

23. The method as claimed in claim 21, wherein the at least one third node acts as one of a L2 relay node and a L3 relay node to relay LPP PDU, the SLPP PDU and SLPP PDU inside LPP PDU between the at least one first node and at least one of the at least one second node and the at least one fourth node.

24. The method as claimed in claim 23, wherein the at least one third node acting as the L2 relay node relays at least one of the LPP PDU and the SLPP PDU from the PDCP layer of the NG-RAN to the PDCP layer of at least one of the at least one fourth node and at least one second node using Side-Link Relay Adaptation (SRAP) protocol layer of the at least one third node.

25. The method as claimed in claim 23, wherein the at least one third node acting as the L3 relay node relays at least one of the LPP PDU and SLPP PDU from at least one of the PC5-RRC layer and SDAP of the at least one third node to at least one of the PC5-RRC layer and SDAP layer of at least one of the at least one fourth node and at least one second node.

26. The method as claimed in claim 1, wherein the at least one first node initiates at least one of SLPP and LPP multiple times among the at least one second node, the at least one third node, and the at least one fourth node in parallel.

27. The method as claimed in claim 26, wherein the at least one first node exchanges the SLPP PDU and LPP PDU using a session ID for a particular session.

28. The method as claimed in claim 6, wherein exchanging the capability message further comprises:

transmitting, by the at least one first node, a request for capability information to the at least one second node and the at least one fourth node; and receiving, by the at least one first node, the capability information from the at least one second node and the at least one fourth node, wherein the capability information comprises at least one of message segmentation capability, positioning reference signal (PRS) processing capability, PC5 capability, positioning server capability, relay capability including L2 and L3 type, positioning methods supported, maximum frequency layer supported, side-link band combination supported, supported bandwidth, supported SCS, PRS processing duration, maximum PRS configuration handling capability, FR1/FR2 support, PRS buffer types, and Quasi Co Location (QCL) capabilities.

29. The method as claimed in claim 28, wherein the request for capability information is transmitted using SLPP capability message, and the capability information is received using SLPP provide capabilities message.

30. The method as claimed in claim 6, wherein exchanging at least one assistance information message further comprises:

receiving, by the at least one first node, a request for assistance data from the at least one second node and the at least one fourth node; and transmitting, by the at least one first node, the assistance data to at least one of the at least one second node and the at least one fourth node, wherein the assistance data comprises at least one of Physical Cell IDs (PCIs), Global Cell IDs (GCIs), and Transmission/Reception Point (TRP) IDs of candidate NR-TRPs, assisting node IDs, reference assisting node, positioning server ID, session ID, an indication of session less operation, assisting node/TRP locations, positioning reference, synchronization offsets.

31. The method as claimed in claim 30, wherein the request for assistance data is received using SLPP request assistance data message, and the assistance data is transmitted using SLPP provide assistance data message.

32. The method as claimed in claim 6, wherein exchanging at least one location request message further comprises:

transmitting, by the at least one first node, a request for location information to the at least one second node and the at least one fourth node; and receiving, by the at least one first node, the location information from the at least one second node and the at least one fourth node, wherein the location information comprises at least one of at least one positioning estimate, at least one positioning measurement, and used at least one SL-PRS configuration.

33. The method as claimed in claim 32, wherein the request for location information is transmitted using SLPP request location information message, and the location information is received using SLPP provide location information message.

34. The method as claimed in claim 6, wherein the error message is transmitted, by the at least one first node, using an error notification message to the at least one second node and the at least one fourth node if an SLPP message is erroneous.

35. The method as claimed in claim 5, wherein the abort message is notified, by the at least one first node, using the at least one second node and the at least one fourth node to abort the procedure.

36. The method as claimed in claim 1, wherein the positioning of the at least one fourth node is performed using at least one of time-based method, angle-based method, and phase-based method.

37. The method as claimed in claim 36, wherein the time-based method comprises at least one of Side-link Time difference of arrival (SL-TDOA) positioning method and Side-link multi-round trip time (SL-mRTT) positioning method.

38. The method as claimed in claim 36, wherein the angle-based method comprises at least one of Side-link Angle of Arrival (SL-AoA) positioning method and Side-link Angle of Departure (SL-AOD) positioning method.

39. The method as claimed in claim 36, wherein the phase-based method comprises SL-carrier phase-based positioning method.

40. The method as claimed in claim 37, wherein the SL-TDOA positioning method comprises:

configuring, by the at least one first node, the at least one second node to transmit at least one Positioning Reference Signal (PRS) to the at least one fourth node;

receiving, by the at least one first node, measurement of at least one of Reference Signal Time (RST), Reference Time of Arrival (RTOA), and Reference Signal Time Difference (RSTD) based on the at least one PRS from the at least one fourth node, wherein the RSTD is a difference between RST of the at least one second node and RST of the at least one fourth node, and wherein the RTOA is a difference between RST and a reference time pre-configured; and receiving, by the at least one first node, measurement of at least one of Angle of Arrival (AoA), Reference Signal Received Power (RSRP), Line of Sight (LOS) probability, and timestamp corresponding to each RSTD/RST from the at least one fourth node.

41. The method as claimed in claim 37, wherein the SL-mRTT positioning method comprises:

configuring, by the at least one first node, the at least one second node to transmit at least one first PRS sequence in a preconfigured PRS resource to the at least one fourth node at a first time instant and to receive at least one second PRS sequence from the at least one fourth node at a second time instant; and receiving, by the at least one first node, measurement from the at least one second node and the at least one fourth node, wherein the measurement comprises at least one of a difference between transmission time at the first time instant and reception time at the second time instant for determination of a Round Trip Time (RTT) in terms of at least one of a Rx-Tx time difference of arrival, a Rx-Rx time difference of arrival, and a Tx-Tx time difference of arrival.

42. The method as claimed in claim 41, wherein the at least one first node performs positioning of the at least one fourth node based on the difference between the transmission time and the reception time, quasi-co-location (QCL) assumptions, Transmission-Reception beam pair hypothesis, and RSRP of the difference between the transmission time and the reception time.

43. The method as claimed in claim 38, wherein the SL-AoA positioning method comprises:

configuring, by the at least one first node, the at least one second node to transmit the at least one PRS to the at least one fourth node; and receiving, by the at least one first node, at least one measurement from the at least one second node and the at least one fourth node, wherein the at least one measurement comprises AoA measured based on at least one tap in a power delay profile (PDP) estimation and antenna parameters.

44. The method as claimed in claim 43, wherein the antenna parameters comprise at least one of antenna spacing, antenna pattern, beamwidth, and antenna power per element.

45. The method as claimed in claim 38, wherein the SL-AOD positioning method comprises:

configuring, by the at least one first node, the at least one second node to transmit the at least one PRS using at least one beam to the at least one fourth node; and receiving, by the at least one first node, at least one power measurement from the at least one second node and the at least one fourth node, wherein the at least one power measurement is performed using reference signal received power (RSRP), received signal strength indicator (RSSI), and signal to noise ratio (SNR).

46. The method as claimed in claim 45, wherein at least one of the at least one fourth node and the at least one second node sweeps at least one beam in the spatial dimension in Zenith and Azimuth direction with redefined angles based on at least one of a number of antennas, antenna type, bore sight, beam width, and beamforming capability.

47. The method as in one of claims 41-45, wherein the at least one second node and at least one fourth node are configured in a complementary direction to receive the at least one PRS over side-link.

48. The method as claimed in claim 39, wherein the SL-carrier phase-based positioning method comprises:

configuring, by the at least one first node, the at least one second node to transmit the at least one PRS to the at least one fourth node; and receiving, by the at least one first node, carrier phase measurement from the at least one second node and the at least one fourth node, wherein the carrier phase measurement is used to measure time of flight and the positioning of the at least one fourth node.

49. The method as in any of claim 40-41 or 43-44, wherein the PRS is at least one pseudo-random sequence.

50. The method as claimed in claim 49, wherein the at least one first node configures the at least one second node to transmit at least one pseudo-random sequence to the at least one fourth node.

51. The method as claimed in claim 49, wherein the at least one pseudo-random sequence is given by:

$$r_{slprs}(m) = \frac{1}{\sqrt{2}}(1 - 2c(2m)) + j\frac{1}{\sqrt{2}}(1 - 2c(2m + 1))$$

52. The method as claimed in claim 49, wherein the at least one pseudo-random sequence is initialized as:

$$c_{init} = \left(2^x\left(N_{symb}^{slot}n_{s,f}^{\mu} + l_{SL\text{-}PRS} + 1\right)(2n_{ID} + 1) + n_{ID}\right)$$

wherein x is an arbitration factor, $c_{init}$ provides an initial seed for pseudo random sequence generation, $n_{ID}$ provide specific identification embedded in the sequence to define the association of the at least one pseudo-random sequence and at least one of the at least one second node and the at least one fourth node.

53. The method as claimed in claim 49, wherein the at least one pseudo-random sequence is filled in side-link slot over at least one of at least one resource blocks (RBs) and at least one symbol in the configured a subchannel.

54. The method as claimed in claim 52, wherein mapping of resource elements of the at least one pseudo-random sequence is given by:

$$r_{k\_slprs,l\_slprs}^{(p,\mu)}(m) = \beta_{slprs}r_{slprs}(m)$$

$$m = 0, 1, 2 \ldots$$

wherein p is a port of the at least one pseudo-random sequence, $\mu$ is a numerology of the at least one pseudo-random sequence, $r_{slprs}$ is the at least one pseudo-random sequence and $\beta_{slprs}$ is power control offset.

55. The method as claimed in claim 49, wherein the at least one pseudo-random sequence is transmitted in comb pattern resources, wherein the comb pattern resources are at least one of fully staggered, partially staggered, and unstaggered in frequency domain.

56. The method as claimed in claim 55, wherein the fully staggered comb pattern resources comprises number of repetitions of the at least one pseudo-random sequence symbol equal to comb factor, the partially staggered comb pattern resources comprises number of repetitions of the at least one pseudo-random sequence less than comb factor and the unstaggered comprises same resource element offset across number of repetitions.

57. The method as claimed in claim 55, wherein the at least one pseudo-random sequence comb pattern resources in the frequency domain is given by:

$$\text{k\_slprs} = mK_{comb}^{SL-PRS} + \left(k_{offset}^{SL-PRS} + k'\right)\mod K_{symb}^{SL-PRS}$$

wherein $$K_{comb}^{SL-PRS}$$

is a possible comb pattern, $$k_{offset}^{SL-PRS}$$

is the resource element offset and $k'$ is a relative offset as function of symbol $l_{SL-PRS}$.

58. The method as claimed in claim 55, wherein the at least one pseudo-random sequence comb pattern resources in a time domain is given by:

$$l_{slprs} = \left[l_{start}^{SL-PRS}, l_{start}^{SL-PRS} + M\right]$$

wherein is $$l_{start}^{SL-PRS}$$

a start of a symbol in a slot and M is a maximum number of repetitions.

59. A method of Side-Link positioning, the method comprising:

establishing, by the at least one second node, a communication link with at least one of the at least one first node, at least one third node, and at least one fourth node, wherein the at least one first node, at least one second node and the at least one fourth node lies in one of in-coverage region, partial-coverage region, and out-of-coverage region, wherein the communication link is established using at least one of side link positioning protocol (SLPP), LTE positioning protocol, NR positioning protocol annex (NRPPa), LTE positioning protocol annex (LPPa), ranging & Sidelink positioning protocol (RSPP) over at least one of PC5, Uu, and NG link;

receiving, by the at least one second node, at least one positioning signaling message from the at least one first node and the at least one fourth node; and transmitting, by the at least one second node, response to at least one positioning signaling message to the at least one first node and the at least one fourth node, wherein the location information comprises at least one of at least one positioning estimate, at least one positioning measurement, and used at least one SL-PRS configuration.

60. The method as claimed in claim 59, wherein exchanging at least one positioning signaling message is performed using SLPP Packet data Unit (PDU) when the at least one second node and the at least one fourth node lies in out-of-coverage region.

61. The method as claimed in claim 60, wherein the at least one positioning signaling message comprises at least one of capability message, assistance information message, location request message, abort message, and error message.

62. The method as claimed in claim 61, wherein the location request message comprises at least one of request location measurement and location information.

63. The method as claimed in claim 59, wherein the at least one first node comprises of a physical layer, Media Access Control (MAC) layer, Radio Link Control (RLC) layer, Internet Protocol (IP layer), Transmission Control Protocol (TCP) layer, Transport Layer Security (TLS) layer, Hypertext Transfer Protocol (HTTP)/2 layer, LTE positioning protocol (LPP) layer, and SLPP layer.

64. The method as claimed in claim 59, wherein the at least one second node and the at least one fourth node comprises of a physical layer, MAC layer, RLC layer, Packet Data Convergence Protocol (PDCP) layer, one or PC5-Radio Resource Control (RRC) layer and SDAP, one of the SLPP layer and the LPP layer.

65. The method as claimed in claim 59, wherein the at least one second node converts the LPP PDU into the SLPP PDU and forwards the SLPP PDU to the at least one at least one first and fourth node over the PC5 link.

66. The method as claimed in claim 59, wherein the at least one second node initiates at least one of SLPP and LPP multiple times among the at least one first node, the at least one second node and the at least one third node in parallel.

67. The method as claimed in claim 66, wherein the at least one second node exchanges the SLPP PDU and LPP PDU using a session ID for a particular session.

68. The method as claimed in claim 61, wherein exchanging the capability message further comprises:

receiving, by the at least one second node, a request for capability information to the at least one second node and the at least one fourth node; and transmitting, by the at least one second node, a response with the capability information of the at least one target node using a SLPP Provide Capabilities message to the at least one first node and the at least one second node, wherein the capability information comprises at least one of message segmentation capability, positioning reference signal (PRS) processing capability, PC5 capability, positioning server capability, relay capability including L2 and L3 type, positioning methods supported, maximum frequency layer supported, side-link band combination supported, supported bandwidth, supported SCS, PRS processing duration, maximum PRS configuration handling capability, FR1/FR2 support, PRS buffer types, and Quasi Co Location (QCL) capabilities.

69. The method as claimed in claim 68, wherein the request for capability information is transmitted using SLPP capability message, and the capability information is received using SLPP provide capabilities message.

70. The method as claimed in claim 61, wherein exchanging the assistance information message further comprises:

transmitting, by the at least one second node, a request for assistance data to the at least one first node and the at least one second node; and receiving, by the at least one second node, the assistance data from at least one of the at least one first node and the at least one second node, wherein the assistance data comprises at least one of Physical Cell IDs (PCIs), Global Cell IDs (GCIs), and Transmission/Reception Point (TRP) IDs of candidate NR-TRPs, assisting node IDs, reference assisting node, positioning server ID, session ID, an indication of session less operation, assisting node/TRP locations, positioning reference, synchronization offsets.

71. The method as claimed in claim 70, wherein the request for assistance data is received using SLPP request assistance data message, and the assistance data is transmitted using SLPP provide assistance data message.

72. The method as claimed in claim 61, wherein exchanging the location request message further comprises:

receiving, by the at least one second node, a request for location information from the at least one first node and the at least one second node; and transmitting, by the at least one second node, the location information to the at least one first node and the at least one second node, wherein the location information comprises at least one of at least one positioning estimate, at least one positioning measurement, and used at least one SL-PRS configuration.

73. The method as claimed in claim 72, wherein the request for location information is received using SLPP request location information message, and the location information is transmitted using SLPP provide location information message.

74. The method as claimed in claim 61, wherein the error message is received by the at least one second node, using an error notification message from the at least one first node and the at least one second node if an SLPP message is erroneous.

75. The method as claimed in claim 61, wherein the abort message is notified by the at least one first node, the at least one second node and the at least one fourth node to abort the procedure.

76. The method as claimed in claim 59, wherein the at least one second node receives at least one pseudo-random sequence from at least one of the at least one first node, at least one of second node at least, one of fourth node.

77. The method as claimed in claim 76, wherein the at least one pseudo-random sequence is given by:

$$r_{slprs}(m) = \frac{1}{\sqrt{2}}(1 - 2c(2m)) + j\frac{1}{\sqrt{2}}(1 - 2c(2m + 1))$$

78. The method as claimed in claim 77, wherein the at least one pseudo-random sequence is initialized as:

$$c_{init} = \left(2^x\left(N_{symb}^{slot}n_{s,f}^{\mu} + l_{SL\text{-}PRS} + 1\right)(2n_{ID} + 1) + n_{ID}\right)$$

wherein x is an arbitration factor, $c_{init}$ provides an initial seed for pseudo random sequence generation, $n_{ID}$ provide specific identification embedded in the sequence to define the association of the at least one pseudo-random sequence and at least one of the at least one second node and the at least one target node.

79. The method as claimed in claim 78, wherein the at least one SL-PRS is filled in side-link slot over Resource Blocks (RBs) and symbols within slot in a subchannel selected or configured.

80. The method as claimed in claim 78, wherein mapping of resource elements of the at least one pseudo-random sequence is given by:

$$r_{k\_slprs,l\_slprs}^{(p,\mu)}(m) = \beta_{slprs}r_{slprs}(m)$$
$$m = 0, 1, 2 \ldots$$

wherein p is a port of the at least one pseudo-random sequence, $\mu$ is a numerology of the at least one pseudo-random sequence, $r_{slprs}$ is the at least one pseudo-random sequence and $\beta_{slprs}$ is power control offset.

81. The method as claimed in claim 76, wherein the at least one pseudo-random sequence is transmitted in comb pattern resources, wherein the comb pattern resources are at least one of fully staggered, partially staggered, and unstaggered in frequency domain.

82. The method as claimed in claim 81, wherein the fully staggered comb pattern resources comprises number of repetitions of the at least one pseudo-random sequence symbol equal to comb factor, the partially staggered comb pattern resources comprises number of repetitions of the at least one pseudo-random sequence less than comb factor and the unstaggered comprises same resource element offset across number of repetitions.

83. The method as claimed in claim 81, wherein the at least one pseudo-random sequence comb pattern resources in the frequency domain is given by:

$$\text{k\_slprs} = mK_{comb}^{SL\text{-}PRS} + \left(k_{offset}^{SL\text{-}PRS} + \overset{\prime}{k}\right)\bmod K_{symb}^{SL\text{-}PRS}$$

wherein $$K_{comb}^{SL\text{-}PRS}$$

is a possible comb pattern, $$k_{offset}^{SL-PRS}$$

is the resource element offset and $\acute{k}$ is a relative offset as function of symbol $1_{SL-PRS}$.

84. The method as claimed in claim 81, wherein the at least one pseudo-random sequence comb pattern resources in a time domain is given by:

$$l_{slprs} = \left[ l_{start}^{SL-PRS}, l_{start}^{SL-PRS} + M \right]$$

wherein is $$l_{start}^{SL-PRS}$$

a start of a symbol in a slot and M is a maximum number of repetitions.

* * * * *